United States Patent
Ikeda et al.

(10) Patent No.: US 8,822,941 B2
(45) Date of Patent: Sep. 2, 2014

(54) RADIATION DETECTING PANEL AND RADIOGRAPHIC DETECTOR

(71) Applicant: Konica Minolta, Inc., Tokyo (JP)

(72) Inventors: Kazuya Ikeda, Higashiyamato (JP); Michihide Murase, Hino (JP)

(73) Assignee: Konica Minolta, Inc. (JP)

( * ) Notice: Subject to any disclaimer, the term of this patent is extended or adjusted under 35 U.S.C. 154(b) by 0 days.

(21) Appl. No.: 13/932,625

(22) Filed: Jul. 1, 2013

(65) Prior Publication Data

US 2014/0014843 A1    Jan. 16, 2014

(51) Int. Cl.
*G01T 1/20*    (2006.01)
(52) U.S. Cl.
USPC .................. 250/370.11; 250/361 R
(58) Field of Classification Search
USPC ........................ 250/361 R, 370.11
See application file for complete search history.

(56) References Cited

U.S. PATENT DOCUMENTS

| | | | |
|---|---|---|---|
| 6,172,371 | B1 | 1/2001 | DeJule et al. |
| 2008/0111083 | A1* | 5/2008 | Kondo et al. ............ 250/370.11 |
| 2012/0097855 | A1* | 4/2012 | Kasai et al. ............. 250/361 R |

FOREIGN PATENT DOCUMENTS

| | | |
|---|---|---|
| JP | 2003-75543 A | 3/2003 |
| JP | 2004-61172 A | 2/2004 |
| JP | 2009-219538 A | 10/2009 |
| JP | 2010-25780 A | 2/2010 |
| JP | 2010-43887 A | 2/2010 |

* cited by examiner

*Primary Examiner* — Mark R Gaworecki
(74) *Attorney, Agent, or Firm* — Cantor Colburn LLP

(57) ABSTRACT

A radiation detecting panel and a radiographic detector are shown. According to one implementation, a radiation detecting panel includes a device substrate and a scintillator. The device substrate includes a two-dimensional array of photoelectric transducers on a first surface of the device substrate. The scintillator substrate includes a scintillator on a first surface of the scintillator substrate. The scintillator converts radiation to light and irradiates the light onto the photoelectric transducers. The device substrate and the scintillator substrate are bonded together such that the photoelectric transducers face the scintillator. A resin layer disposed between the photoelectric transducers and the scintillator has a glass-transition temperature of 60° C. or higher.

15 Claims, 14 Drawing Sheets

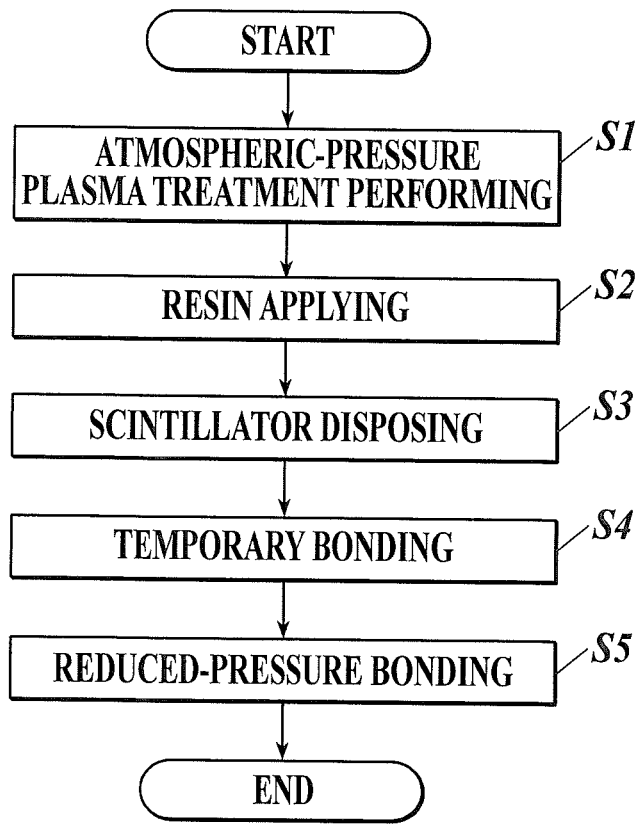
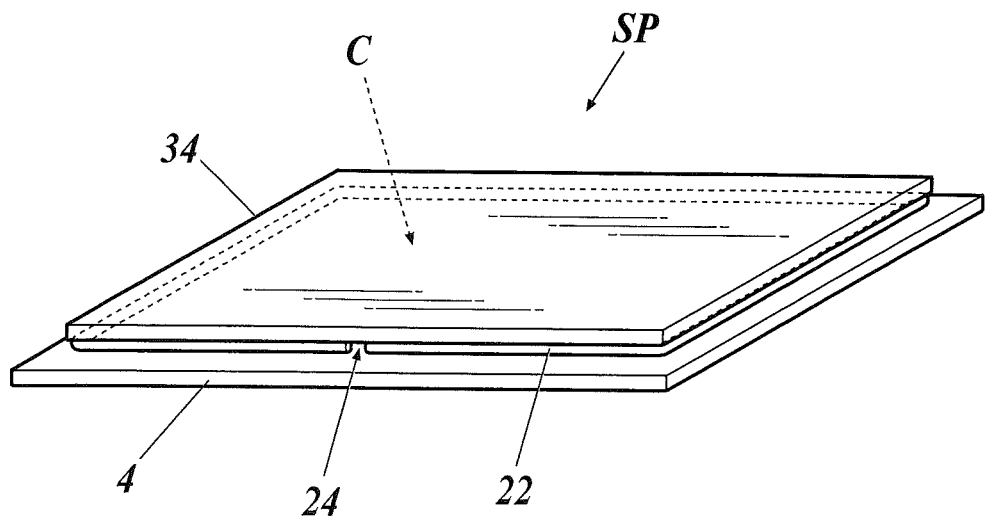

RADIATION DETECTING PANEL AND RADIOGRAPHIC DETECTOR

CROSS REFERENCE TO RELATED APPLICATIONS

The present invention claims priority under 35 U.S.C. §119 to Japanese Application Nos. 2012-155250, filed Jul. 11, 2012, and 2013-005046, filed Jan. 16, 2013, the entire contents of which are incorporated herein by reference.

BACKGROUND

1. Field of the Invention

The present invention relates to a radiation detecting panel and a radiographic detector.

2. Description of Related Art

Radiographic detectors or flat panel detectors (FPDs) have been developed. Such detector includes a scintillator and a radiation detecting panel. The scintillator converts incident radiation to light, such as visible light, and the radiation detecting panel includes a two-dimensional matrix of photoelectric transducers for detecting the converted light, such as photodiodes, disposed on a substrate (for example, refer to Japanese Patent Application Laid-Open Publication Nos. 2009-219538 and 2010-43887 and U.S. Pat. No. 6,172,371). The light incident on the photoelectric transducers are converted to electric chargers, and the generated electric chargers are extracted to detect as electrical signals the information carried by the incident radiation from a subject.

For example, as illustrated in FIG. 23, a radiographic detector may include a radiation detecting panel 100 that includes a two-dimensional matrix of photoelectric transducers 102 disposed on a device substrate 101 and a scintillator 104 bonded to a scintillator substrate 103 so as to face the photoelectric transducers 102 from above (for example, refer to Japanese Patent Application Laid-Open Publication Nos. 2003-75543, 2004-61172, and 2010-25780).

In the radiographic detector, the radiation detecting panel 100 is accommodated in a housing (not shown in the drawing). Regarding the relative positions of individual components in the radiographic detector and the radiation detecting panel described below, the vertical direction is determined in a state in which the radiographic detector and the radiation detecting panel are disposed such that the scintillator is disposed above the photoelectric transducers. It is noted that the positions of the components vary in both the vertical and horizontal directions with a change in the posture of the radiographic detector.

As illustrated in FIG. 24, which is an enlarged view of FIG. 23 including the photoelectric transducers 102, the scintillator 104 covering the photoelectric transducers 102 and a smoothing layer 105 smoothening the bumps on the surfaces of the photoelectric transducers 102 may be bonded together with a bonding layer 106 composed of a resin, in some cases. Reference numeral 107 shown in FIG. 24 illustrates wiring such as a signal line associated with the photoelectric transducers 102.

In a radiation detecting panel 100, for example, having a structure illustrated in FIGS. 23 and 24, the distance between the photoelectric transducers 102 and the scintillator 104 may vary due to softening of the cured bonding layer 106 caused by an increase in the temperature of the radiation detecting panel, for example. As a result, the light generated in the scintillator 104 by converting the incident radiation may leak out to the photoelectric transducers 102 other than the photoelectric transducer 102 directly below the position from which the generated light is emitted, changing the sharpness of the resulting radiographic image.

The separation of the bonding layer 106 from the scintillator 104 and/or the smoothing layer 105 adjoining the photoelectric transducers 102, for example, due to warpage of the radiation detecting panel reduces the geometric precision of the photoelectric transducers 102 and the scintillator 104. As described above, a large amount of light from the scintillator 104 may leak out to the photoelectric transducers 102 other than the photoelectric transducer 102 directly below the incident position from which the generated light is emitted, reducing the sharpness of the resulting radiographic image.

As will be described below, any other resin layer having a different function may be disposed between the scintillator 104 and the smoothing layer 105 adjoining the photoelectric transducers 102 in place of the bonding layer 106. In such a case, the softening or separation of the resin layer may cause various drawbacks, such as low sharpness of the radiographic image, similar to that described above.

SUMMARY

An object of the present invention, which has been conceived in light of the circumstances described above, is to provide a radiation detecting panel and a radiographic detector that prevent softening of a resin layer disposed between photoelectric transducers and a scintillator, and capture radiographic images having stable quality without a decrease in sharpness.

According to an aspect of the present invention, there is provided a radiation detecting panel including:

a device substrate including a two-dimensional array of photoelectric transducers on a first surface of the device substrate; and a scintillator substrate including a scintillator on a first surface of the scintillator substrate, the scintillator converting radiation to light and irradiating the light onto the photoelectric transducers, wherein the device substrate and the scintillator substrate are bonded together such that the photoelectric transducers face the scintillator, and a resin layer disposed between the photoelectric transducers and the scintillator has a glass-transition temperature of 60° C. or higher.

BRIEF DESCRIPTION OF THE DRAWINGS

The present invention will become more fully understood from the detailed description given hereinbelow and the appended drawings, and thus are not intended to define the limits of the present invention, and wherein;

FIG. 15 is a flowchart of a method of producing a radiation detecting panel;

FIG. 16 illustrates a device substrate and a scintillator substrate in a temporarily bonded state in which an adhesive surrounds photoelectric transducers and has an opening;

DETAILED DESCRIPTION OF PREFERRED EMBODIMENTS

An embodiment of a radiation detecting panel and a radiographic detector of the present invention is described with reference to the drawings.

A portable radiographic detector will now be described. Alternatively, the present invention may be applied to a stand-alone radiographic detector integrated with a support base and to a radiation detecting panel provided for the radiographic detector.

[Structure of Radiation Detecting Panel and Radiographic Detector]

Figure 1:
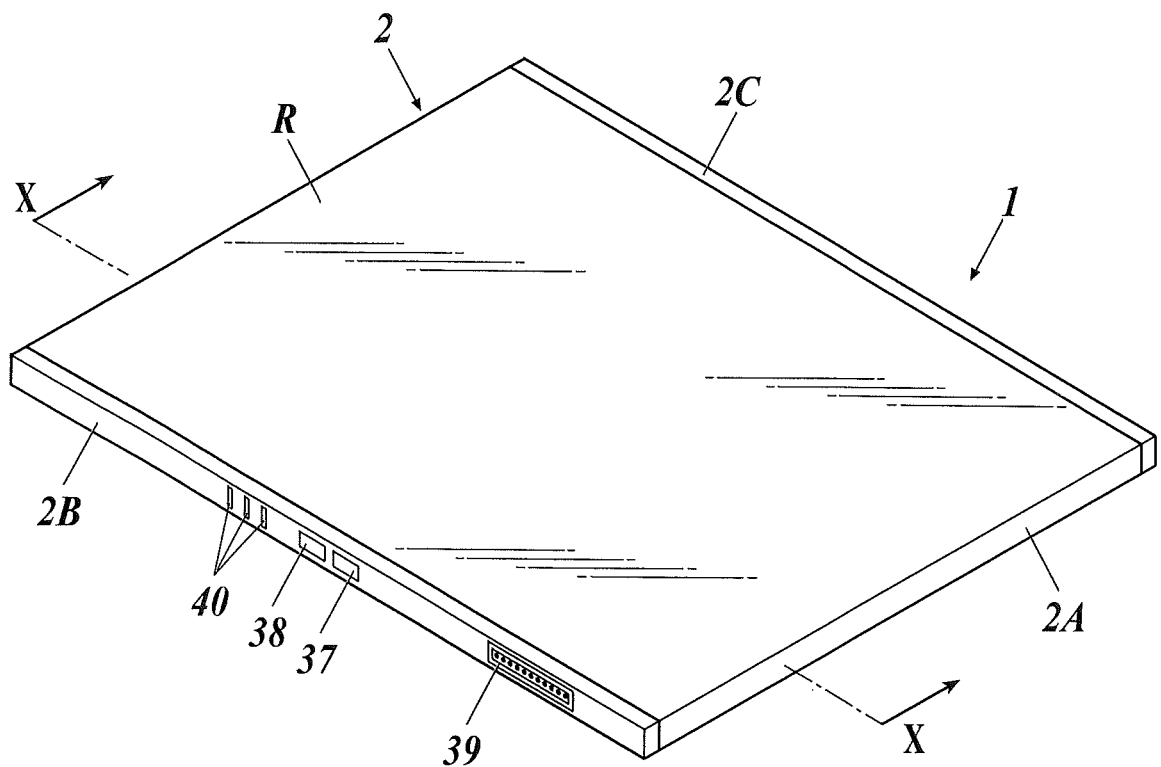
FIG. 1 is an external perspective view of a radiographic detector according to an embodiment.
Figure 2:
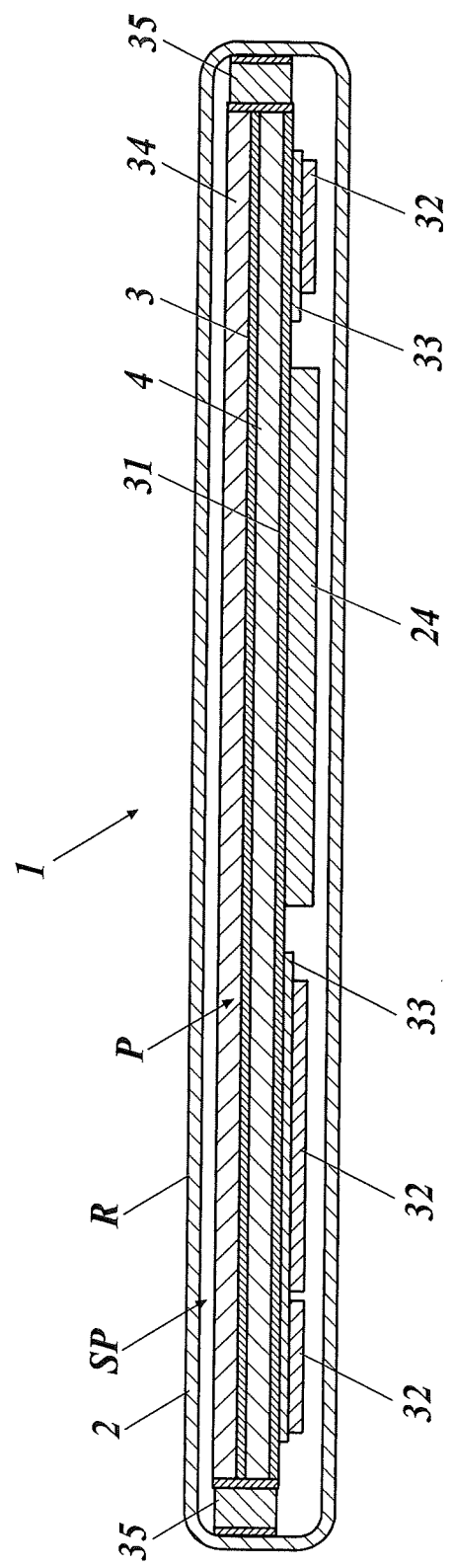
FIG. 2 is a cross-sectional view taken along line X-X in FIG. 1.

FIG. 1 is an external perspective view of a radiographic detector according to this embodiment. FIG. 2 is a cross-sectional view taken along line X-X in FIG. 1. As illustrated in FIGS. 1 and 2, a housing 2 of a radiographic detector 1 accommodates a radiation detecting panel SP.

In this embodiment, the housing 2 is composed of a hollow rectangular housing main portion 2A that has a radiation incident surface R on the side on which radiation is incident and covers 2B and 2C. The housing main portion 2A of the housing 2 is composed of a material that transmits radiation, such as a carbon or plastic sheet. The openings on both sides of the housing main portion 2A of the housing 2 are covered with the covers 2B and 2C.

The monocoque housing 2 may alternatively be, for example, a box housing composed of a front component and a back component fit together.

In this embodiment, the cover 2B on one side of the housing 2 includes a power switch 37, a selector switch 38, a connector 39, and an indicator 40. Although not shown in the drawings, this embodiment includes an antenna on the cover 2B of the housing 2 or the cover 2C on the other side of the housing 2 to establish wireless communication with external devices.

As illustrated in FIG. 2, the housing 2 accommodates the radiation detecting panel SP. A device substrate 4 is disposed over the radiation detecting panel SP. A substrate 31 is disposed below the device substrate 4 with a thin lead plate (not shown) disposed therebetween. The substrate 31 is provided with a PCB board 33 having electronic components 32 attached to the bottom side, an internal power source 24, and other components.

As described below, a plurality of photoelectric transducers 7 are disposed on the radiation incident surface R, i.e., the upper surface of the device substrate 4. A scintillator substrate 34 is disposed above the device substrate 4. A scintillator 3 is disposed on one surface (i.e., lower surface) of the scintillator substrate 34 to convert incident radiation to light and irradiate the light onto the photoelectric transducers 7 on the device substrate 4. The device substrate 4 and the scintillator substrate 34 are bonded together such that the photoelectric transducers 7 on the device substrate 4 face the scintillator 3. This will be described in detail below.

In this embodiment, a buffer 35 is disposed between the radiation detecting panel SP and a side of the housing 2 to prevent them from coming into contact.

Figure 3:
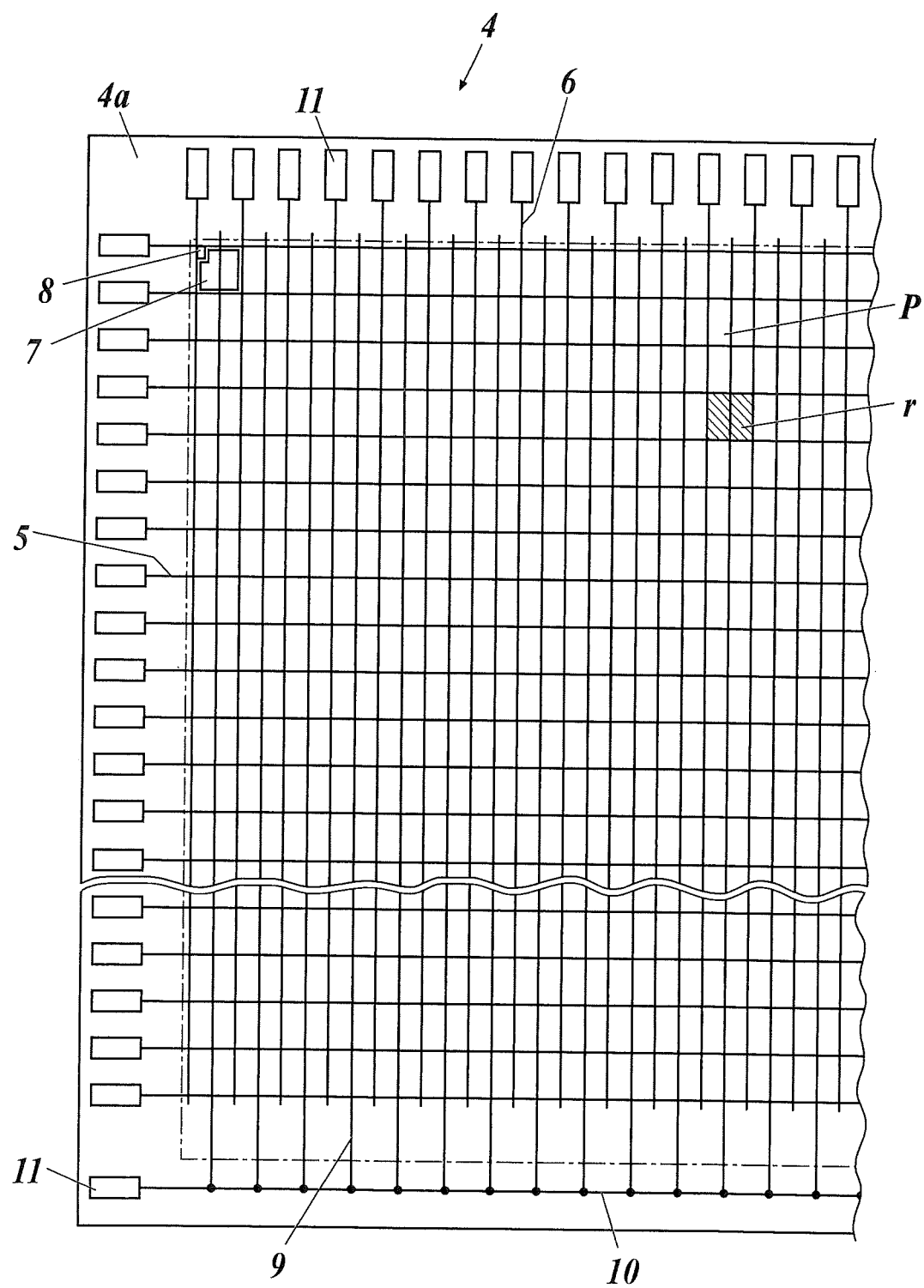
FIG. 3 is a plan view of the configuration on a device substrate.

FIG. 3 is a plan view of the configuration of the device substrate 4. Scanning lines 5 intersect signal lines 6 on the upper surface 4a (i.e., surface facing the scintillator 3) of the device substrate 4. The photoelectric transducers 7, which are composed of photodiodes, are disposed inside the respective small regions r defined by the scanning lines 5 and the signal lines 6.

In this embodiment, the photoelectric transducers 7 form a two-dimensional matrix on the upper surface 4a of the device substrate 4. The two-dimensional matrix of the photoelectric transducers 7 constitutes a detector unit P of the radiographic detector 1. As illustrated in FIG. 3, the photoelectric transducers 7 each include a thin film transistor (TFT) 8, which is a switching element.

In this embodiment, a bias line 9 is provided for each row of the two-dimensionally-arranged photoelectric transducers 7 and the bias line 9 is connected to the individual photoelectric transducers 7 in the row. In this embodiment, the bias lines 9 are connected to a single binding line 10 at one edge of the device substrate 4. A reverse bias voltage from a bias supply (not shown) is applied to the photoelectric transducers 7 via the binding line 10 and the bias lines 9.

The scanning lines 5, the signal lines 6, and the binding line 10 of the bias lines 9 extend to the edge portion of the upper surface 4a of the device substrate 4. Input/output (I/O) terminals 11 or pads to which the scanning lines 5, the signal lines 6, and the binding line 10 of the bias lines 9 are connected are disposed in the edge portion.

Figure 4:
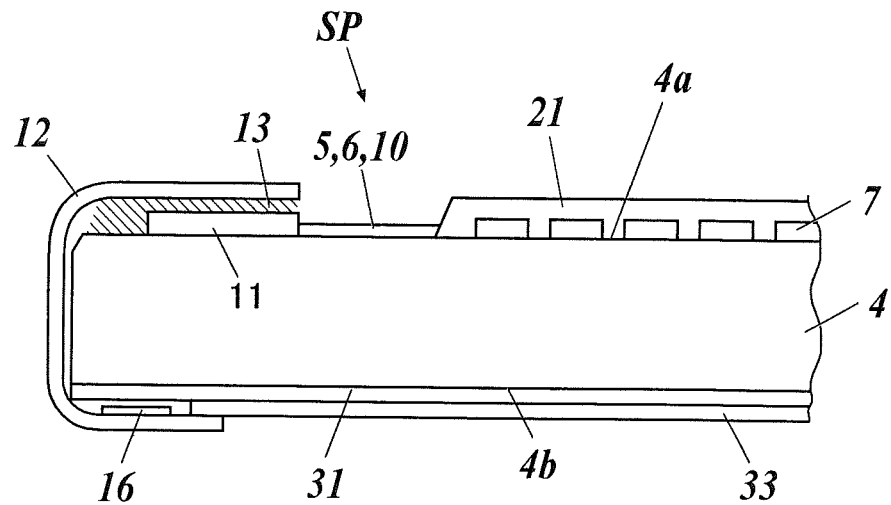
FIG. 4 illustrates a flexible circuit board pressure-bonded to input/output terminals on a radiation detecting panel, extending to the lower surface of a device substrate, and connected to a PCB board by pressure-bonding.

As illustrated in FIG. 4, a flexible circuit board 12 or a chip-on film, which includes an embedded chip 16, such as an IC chip, is pressure-bonded to the I/O terminals 11 with an anisotropic conductive adhesive 13, such as an anisotropic conductive film or paste. The flexible circuit board 12 extends to the lower surface 4b of the device substrate 4. The flexible circuit board 12 and the PCB board 33 are pressure-bonded on the lower surface 4b to be connected.

A resin, for example, is applied over the photoelectric transducers 7 to form a smoothing layer 21 to smoothen the bumps on the surface, as illustrated in FIG. 4. The smoothing layer 21 is composed of, for example, a transparent acrylic resin that transmits light from phosphor 3a in the scintillator 3, which is described below. In FIG. 4, the scintillator 3 and the electronic component 32 (see FIG. 2) are not illustrated.

The scintillator 3 (see FIG. 2) is mainly composed of phosphor and converts radiation incident on the radiation incident surface R to light and irradiates the light onto the photoelectric transducers 7. In this embodiment, the scintillator 3 converts incident radiation, such as X-rays, to light having a wavelength within the range of 300 to 800 nm. The composition of the phosphor in the phosphor layer is not particularly limited. One or more types of phosphor that generate high-intensity light upon reception of radiation may be used. The phosphor may be composed of any base material, such as CsI:Tl, activated by a light-emitting principal substance, e.g., $CaWO_4$, $YTaO_4$, $YTaO_4$:Tm, $YTaO_4$:Nb, $BaSO_4$:Pb, $HfO_2$:Ti, $HfP_2O_7$:Cu, $CdWO_4$, $Gd_2O_2S$:Tb, $GdTaO_4$:Tb, $Gd_2O_3.Ta_2O_5.B_2O_3$:Tb, $(Gd,Y)_2O_2S$:Tb, $Gd_2O_2S$:Tb, $Gd_2O_2S$:Tb, Dy, or $(Gd,Y)_2O_2S$:Tb,Tm.

Figure 5:
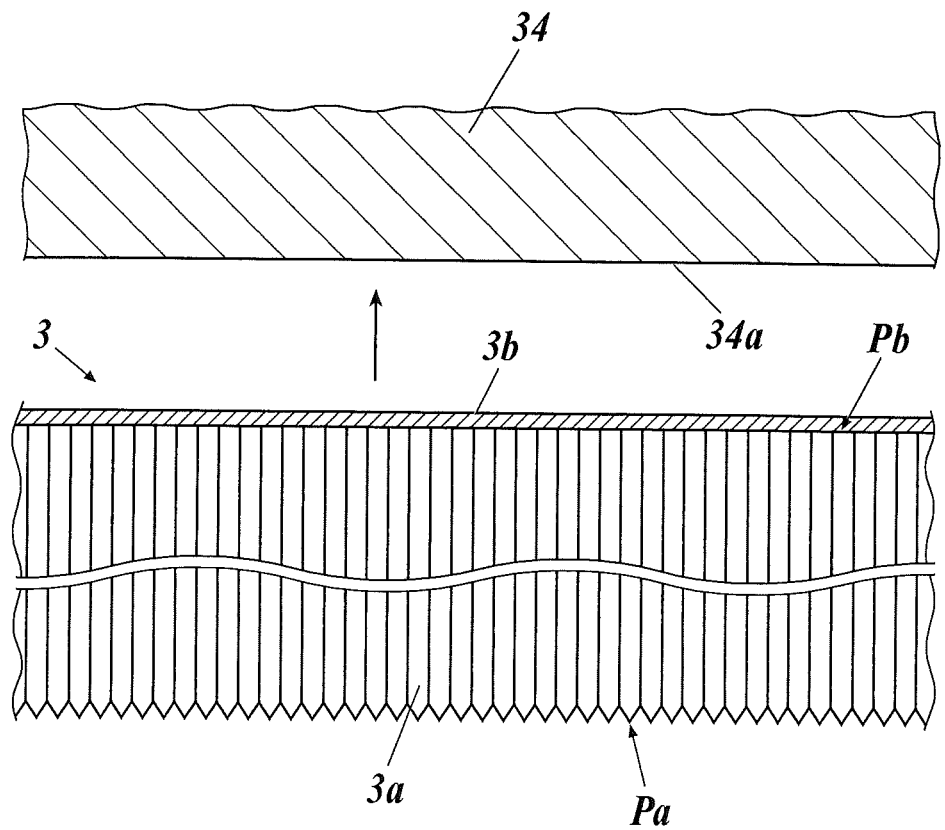
FIG. 5 is a schematic view of the configuration of columnar crystals of a phosphor in a scintillator and bonding of the scintillator to a support.

In this embodiment, the phosphor 3a in the scintillator 3 is, for example, vapor-deposited on a support 3b, which is composed of a polymeric material, and grown into columnar crystals, as illustrated in FIG. 5. The vapor deposition process is preferably evaporation or sputtering.

Figure 23:
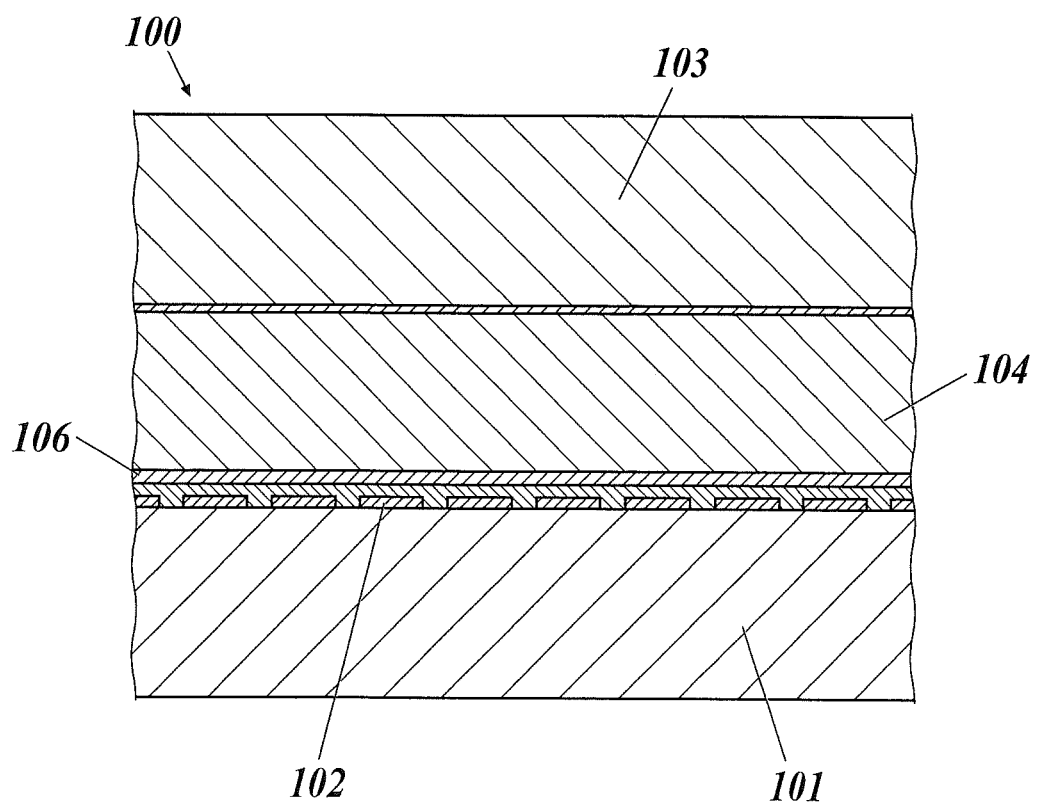
FIG. 23 is a cross-sectional view of a radiation detecting panel including photoelectric transducers on a device substrate and a scintillator disposed over the photoelectric transducers.
Figure 24:
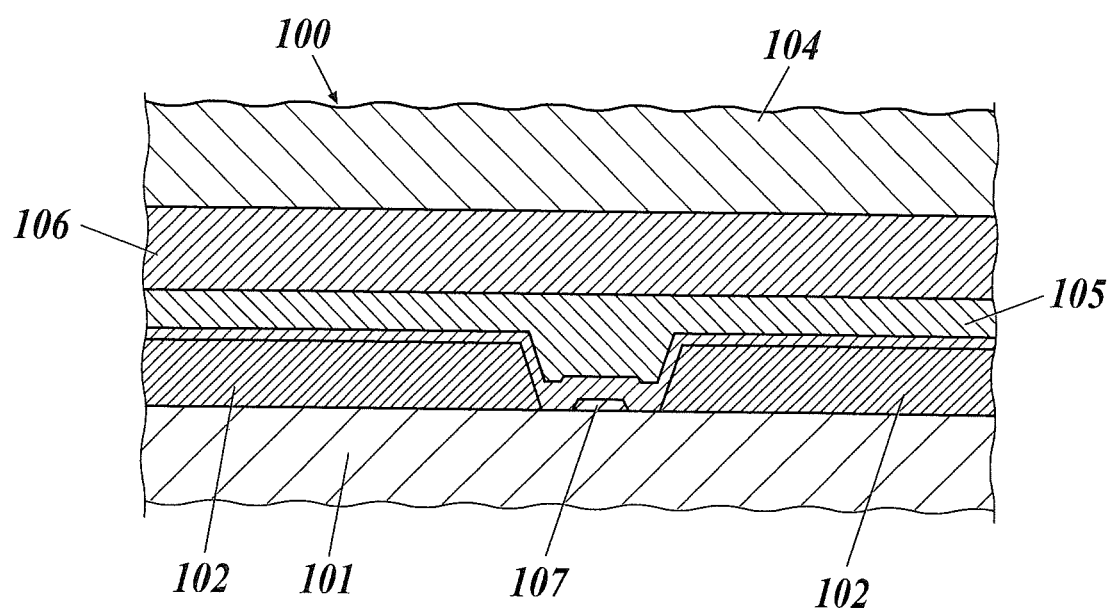
FIG. 24 is an enlarged view of a section of FIG. 23 illustrating photoelectric transducers.

Similar to the scintillator 104 illustrated in FIGS. 23 and 24, the scintillator 3 may be composed of a phosphor paste applied to a surface of the scintillator substrate 34 (scintillator substrate 103 in FIGS. 23 and 24).

The phosphor paste may be prepared by mixing and dispersing the phosphor particles with and in a phosphor binding resin and an organic solvent. The phosphor binding resin for preparing a phosphor coating paste used in the production of the scintillator 3 according to the present invention is not particularly limited and may be any known scintillator binder. Examples of the resin include nitrocellulose, cellulose acetate, ethyl cellulose, polyvinyl butylal, linear polyesters, polyvinyl acetate, vinylidene chloride-vinyl chloride copolymers, vinyl chloride-vinyl acetate copolymers, poly(alkyl methacrylate)s, polycarbonates, polyurethanes, cellulose acetate butyrates, polyvinyl alcohol, gelatin, polysaccharides, such as dextrin, and gum arabic.

The weight of the phosphor binding resin to be used is preferably within the range of 1% to 10% to the weight of the phosphor in the phosphor layer in order to maintain the sharpness and durability of the scintillator 3.

The glass-transition temperature of the phosphor binding resin according to the present invention is preferably 60° C. or higher. As will be described below, the glass-transition temperature of the resin layer disposed between the scintillator 3 and the photoelectric transducers 7, smoothing layer 21 according to this embodiment of the present invention is 60° C. or higher. If the phosphor binding resin has a glass-transition temperature lower than 60° C., the flexibility of the phosphor binding resin repeatedly changes due to repeated changes in the temperature of the operational environment. This may cause warpage in the resin layer and/or a protective layer and may further cause unevenness in images and/or boundary separation. To prevent such drawbacks, the glass-transition temperature of the phosphor binding resin should be higher than 60° C. such that the flexibility of the resin does not vary in the operational environment.

Two or more phosphor binding resins of different types may be mixed. In such a case, the advantages described above can be achieved by at least one of the phosphor binding resins having a glass-transition temperature of 60° C. or higher. Preferably, at least ½ in weight of the phosphor binding resins to be used has a glass-transition temperature of 60° C. or higher. A radiographic detector produced with phosphor binding resins having such a composition does not acquire images with unevenness and/or undergo boundary separation, for example, even after 10 thermal cycles between 0° C. and 45° C. and/or a load of 400 kg to the entire surface.

The organic solvents used for the adjustment of the phosphor coating are, for example, ethanol, ethyl methyl ether, butyl acetate, ethyl acetate, ethyl ether, and xylenes. If required, dispersants, such as phthalic acids and stearyl phosphate, and/or plasticizers, such as triphenyl phosphate and diethyl phthalate, are added to the phosphor coating solution.

If required, a protective layer is disposed over the phosphor layer, which is prepared as described above. The protective layer is prepared by laminating a transparent film having an adhesive sublayer on the phosphor layer. The transparent layer may be composed of, for example, polyethylene terephthalate, polyethylene naphthalate, polyethylene, polyvinylidene chloride, and polyamides. The glass-transition temperature of the protective film is preferably 60° C. or higher.

The scintillator 3 according to the present invention may be prepared through procedures other than those described above. For example, the scintillator 3 can be prepared by disposing a protective layer over a smooth substrate, disposing a phosphor layer (i.e., columnar crystals in this embodiment) over the protective layer, separating the phosphor layer, together with the protective layer, from the substrate, and bonding a support over the phosphor layer (i.e., on the opposite side from the protective layer).

The scintillator substrate 34 in the scintillator 3 according to the present invention (see FIGS. 2 and 5) is composed of a glass plate; a resin film of, for example, cellulose acetate, cellulose propionate, cellulose acetate butyrate, polyester, such as polyethylene terephthalate, polystyrene, polymethyl methacrylate, polyamide, polyimide, vinyl chloride-vinyl acetate copolymer, or polycarbonate; paper, such as baryta paper, resin coated paper, or normal paper; or aluminum-alloy foil.

In such a case, the support 3b is bonded to the lower surface 34a of the scintillator substrate 34 such that the tips Pa of the columnar crystals of the phosphor 3a point downward, i.e., toward the photoelectric transducers 7 and the smoothing layer 21 of the device substrate 4, as illustrated in FIG. 5. In this embodiment, the scintillator 3 is disposed over one face, i.e., the lower surface 34a of the scintillator substrate 34.

Figure 6:
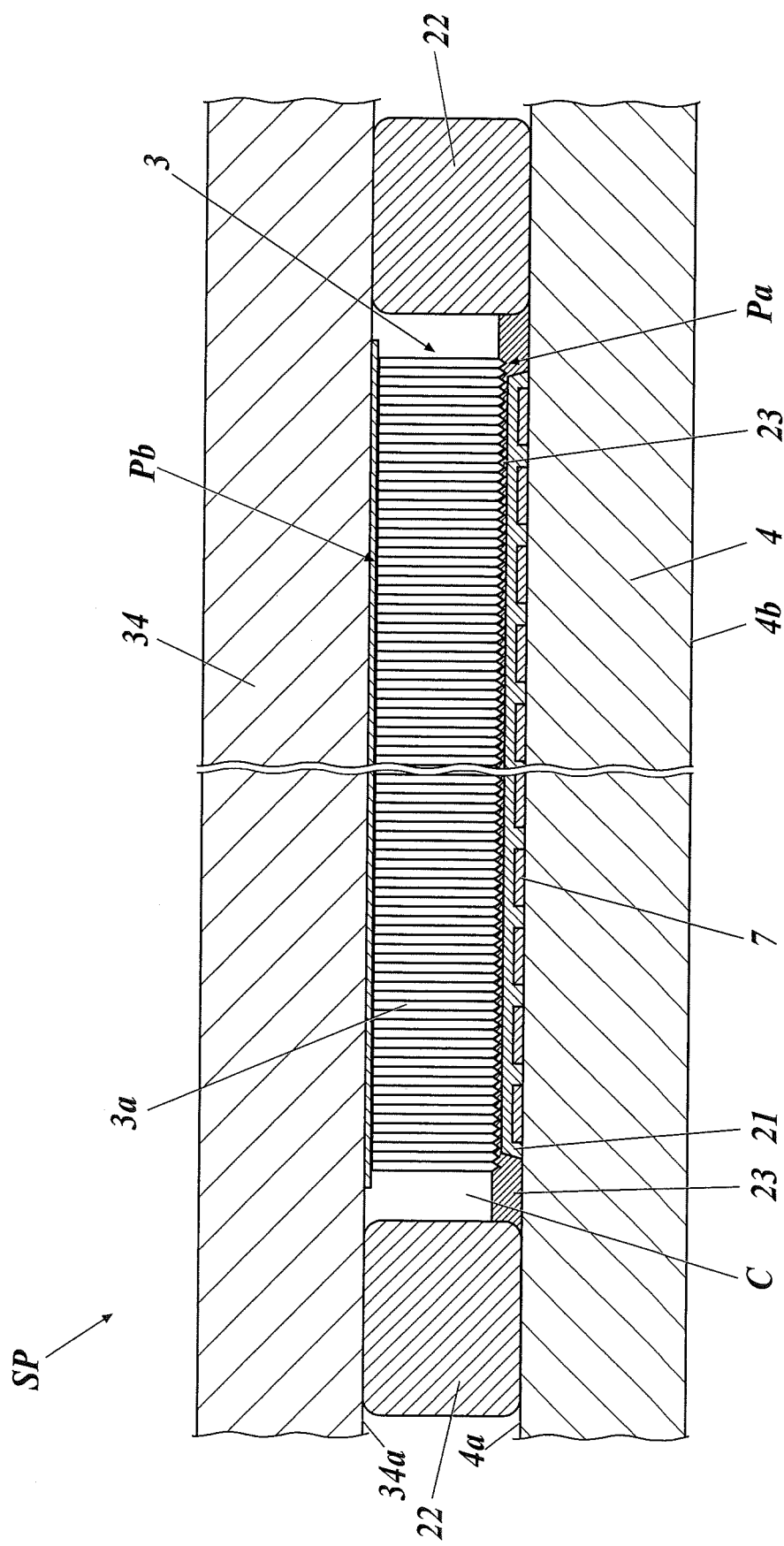
FIG. 6 is an enlarged cross-sectional view of the radiation detecting panel in FIG. 2.

In this embodiment, the radiation detecting panel SP is prepared by bonding together the device substrate 4 and the scintillator substrate 34 such that the photoelectric transducers 7 faces the scintillator 3, as illustrated in FIG. 6.

In FIG. 6 and other drawings, the relative size and thickness of the components and the distance between the components in the radiation detecting panel SP do not necessarily represent the actual structure of the radiation detecting panel SP. As will be described in detail below, an optical compensation layer 23 is disposed as a resin layer between the smoothing layer 21 and the region containing the tips Pa of the columnar crystals of the phosphor 3a in the scintillator 3.

In this embodiment, an adhesive 22 is disposed in the gap between the device substrate 4 and the scintillator substrate 34 and surrounds the photoelectric transducers 7 and the scintillator 3. The adhesive 22 bonds together the device substrate 4 and the scintillator substrate 34.

The adhesive 22 surrounds the photoelectric transducers 7 and the scintillator 3 to bond together the device substrate 4 and the scintillator substrate 34, defining an inner space C isolated from the outside. In this embodiment, the internal pressure of the inner space C is reduced to be lower than the atmospheric pressure.

Figure 7:
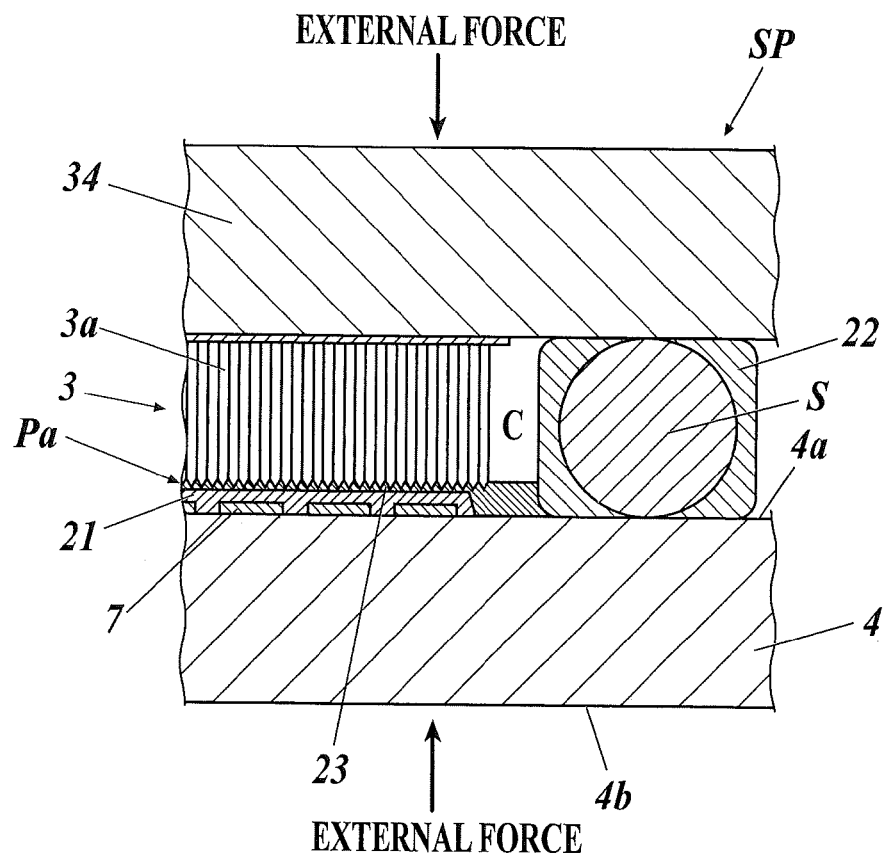
FIG. 7 illustrates the function of spacers maintaining the gap between a device substrate and a scintillator substrate against external forces causing the substrates to move close to each other.

The pressure lowered in the inner space C causes the device substrate 4 and the scintillator substrate 34 to be constantly urged toward the inner space C from the outside due to external pressure or the atmospheric pressure, as illustrated in FIG. 7. As a result, the separation of the device substrate 4 and the scintillator substrate 34 of this embodiment is prevented by the urging caused by the atmospheric pressure.

In this embodiment, spherical or bar spacers S, for example, are added to the adhesive 22 as illustrated in FIG. 7 so that the edges of the device substrate 4 and the scintillator substrate 34 urged by the atmospheric pressure do not get too close to each other.

In this embodiment, the adhesive 22 surrounds the photoelectric transducers 7 and the scintillator 3, and the device substrate 4 and the scintillator substrate 34 are bonded together, as described above. Alternatively, the radiation detecting panel SP may be bonded to the scintillator 3 and the smoothing layer 21 (scintillator 104 and the smoothing layer 105) with an adhesive (adhesive layer 106), as illustrated in FIG. 23, for example.

That is, the resin layer according to the present invention that is disposed between the scintillator 3 and the photoelectric transducers 7, smoothing layer 21 is not limited to the optical compensation layer 23 according to this embodiment and otherwise may be an adhesive layer.

[Optical Compensation Layer]

Figure 8:
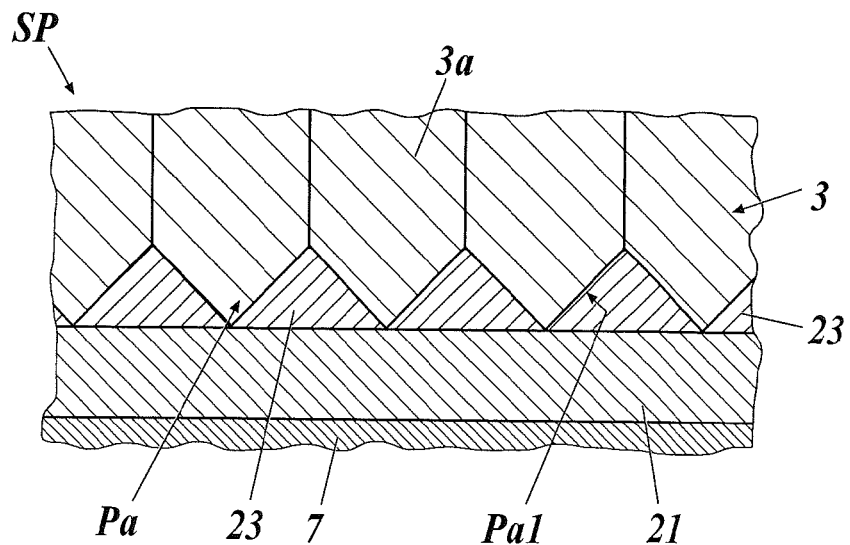
FIG. 8 is an enlarged view of FIG. 6 and illustrates an optical compensation layer disposed between a smoothing layer and a columnar crystal tip region of phosphor in a scintillator.

The optical compensation layer 23 as the resin layer disposed between the scintillator 3 and the photoelectric transducers 7, smoothing layer 21 will now be described. In this embodiment, the optical compensation layer 23 as the resin layer is disposed between the smoothing layer 21 and regions including the columnar crystal tips Pa of the phosphor 3a in the scintillator 3 (hereinafter referred to as "tip Pa regions"), as illustrated in FIGS. 6 and 8.

Figure 9:
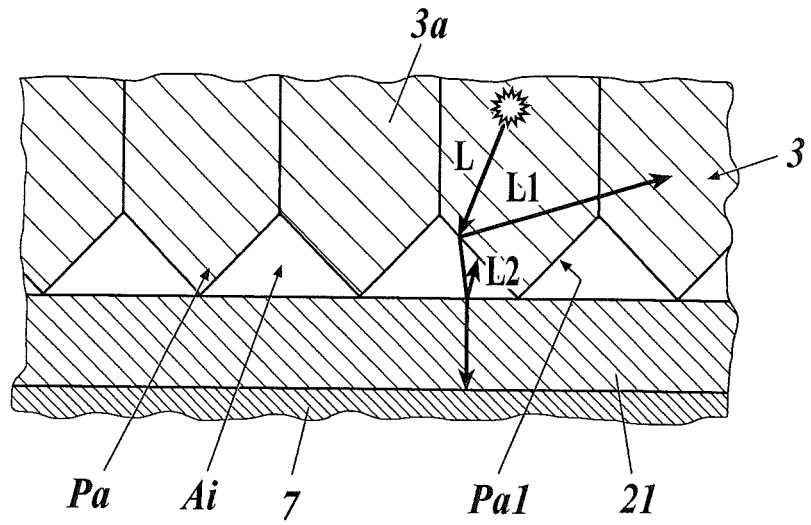
FIG. 9 illustrates the light generated inside phosphor in a scintillator being reflected at an interface.

If the optical compensation layer 23 is not disposed between the scintillator 3 and the smoothing layer 21, an air layer Ai (or, in this embodiment, a low-vacuum layer as described below, the same applies hereinafter) is disposed between the scintillator 3 and the smoothing layer 21, as illustrated in FIG. 9. The radiation irradiated on such a radiographic detector reaches the scintillator 3 and is converted to light L in the phosphor 3a in the scintillator 3. The light L propagates through the columnar crystals of the phosphor 3a toward the smoothing layer 21 and the photoelectric transducers 7.

In such a case, a part L1 of the light L that propagates through the phosphor 3a is reflected inside the phosphor 3a at the substantially conical walls Pa1 in the columnar crystal tip Pa regions of the phosphor 3a. A part L2 of the light L that enters the air layer Ai from the phosphor 3a is reflected at the surface of the smoothing layer 21. The light L that is generated inside the phosphor 3a and reflected at the surface of the smoothing layer 21 and the walls Pa1 in the tip Pa regions of the phosphor 3a causes the parts L1 and L2 of the light L to propagate in a direction orthogonal to the longitudinal direction of the columnar crystals of the phosphor 3a (i.e., the horizontal direction in FIG. 9).

The radiographic detector and the radiation detecting panel acquire radiographic images with high sharpness as a result of the light L generated in each phosphor 3a of the scintillator 3 entering the photoelectric transducer 7 directly below the position from which the generated light is emitted (i.e., below the phosphor 3a indicated in FIG. 9). As described above, an increase in the amount of the light L, which is generated inside the phosphor 3a, propagates along the surface as a result of reflection at the walls Pa1 and the surface of the smoothing layer 21 causes part of the light L to be received not by the intended photoelectric transducer 7 directly below the phosphor 3a but by other photoelectric transducers 7. Thus, the resulting radiographic image may not have sufficient sharpness.

The light L1 reflected at the substantially conical walls Pa1 in the columnar crystal tip Pa regions of the phosphor 3a in the scintillator 3 and the light L2 reflected at the surface of the smoothing layer 21 are reflected again at the walls of the phosphor 3a. As a result, multireflection of the light occurs.

If such multireflection is repeated, this causes an increase in the amount of reflected light absorbed at the phosphor 3a and other components. Thus, the part of the light L initially generated in the phosphor 3a is lost before reaching the photoelectric transducers 7, lowering the sensitivity of the image acquisition.

As described above, the proportion of the light L1 and L2 reflected at the walls Pa1 of the tip Pa regions of the phosphor 3a and the surface of the smoothing layer 21 to the light L generated in the phosphor 3a in the scintillator 3 increases due to a relatively large difference between the refractive indices of the phosphor 3a and the air layer Ai, which come into contact at the interface of the walls Pa1 of the phosphor 3a or between the refractive indices of the layer of the air layer Ai and the smoothing layer 21 which come into contact at the interface of the surface of the smoothing layer 21.

Specifically, in this embodiment, the refractive index $n_{3a}$ of the columnar crystals of the phosphor 3a in the scintillator 3 is approximately 1.8, and the refractive index $n_{21}$ of the acrylic resin or the smoothing layer 21 is approximately 1.5, whereas the refractive index $n_{Ai}$ of the air layer Ai is approximately 1.0. As can be seen from the above, there is a large difference. As is well known, light is reflected at a larger angle at the interface of two layers as the difference of the refractive indices between the two layers increases. That is, the amount of reflected light increases.

The optical compensation layer 23 as the resin layer disposed between the scintillator 3 and the photoelectric transducers 7, the smoothing layer 21, such as in the radiation detecting panel SP according to this embodiment illustrated in FIG. 8, decreases such difference in refractive index at the interface, decreasing the amount of light reflected at the interface.

Figure 10:
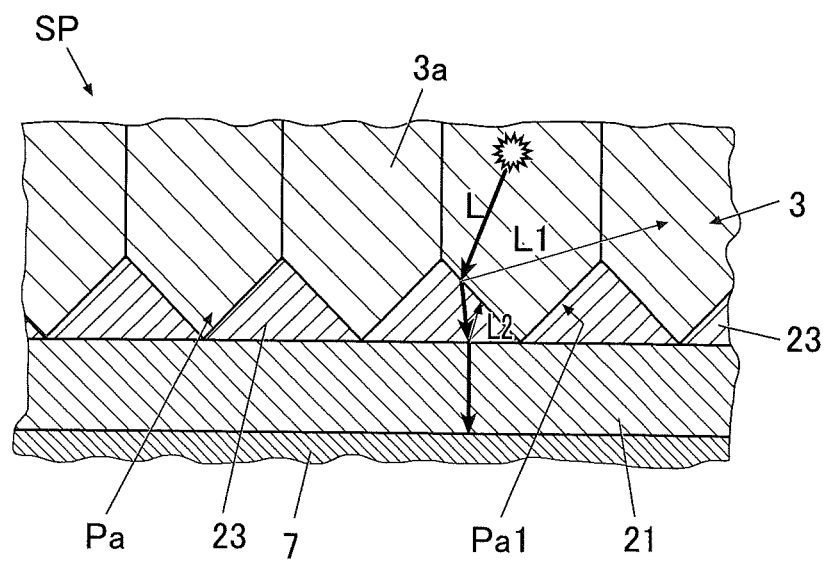
FIG. 10 illustrates an optical compensation layer according to this embodiment reducing the amount of light reflected at an interface and guiding most of the light into photoelectric transducers.

If the optical compensation layer 23 is disposed between the scintillator 3 and the smoothing layer 21, as illustrated in FIG. 10, the radiation irradiated on the radiographic detector is converted to the light L in the phosphor 3a in the scintillator 3 to be emitted, as described above. The light L propagates through the columnar crystals of the phosphor 3a toward the smoothing layer 21 and the photoelectric transducers 7.

The light L propagates through the phosphor 3a and reaches the substantially conical walls Pa1 in the columnar crystal tip Pa regions of the phosphor 3a. The small difference between the refractive index $n_{3a}$ of the phosphor 3a and the refractive index $n_{23}$ of the optical compensation layer 23 formed from resin reduces the amount of the light L1 reflected at the walls Pa1. As a result, most of the light L enters the optical compensation layer 23.

The light L propagates through the optical compensation layer 23 and reaches the interface of the optical compensation layer 23 and the smoothing layer 21 (i.e., the surface of the smoothing layer 21). The small difference between the refractive index $n_{23}$ of the optical compensation layer 23 formed from resin and the refractive index $n_{21}$ of the smoothing layer 21 reduces the amount of the light L2 reflected at the surface of the smoothing layer 21. As a result, most of the light L enters the smoothing layer 21.

The optical compensation layer 23 as the resin layer according to this embodiment, which is disposed between the scintillator 3 and the photoelectric transducers 7, the smoothing layer 21, reduces the difference between the refractive indices of phosphor 3a in the scintillator 3 and the optical compensation layer 23 and between the refractive indices of the optical compensation layer 23 and the smoothing layer 21 at the interfaces and reduces the amount of the light L1 and L2 reflected at the interface.

The amount of the light L1 and L2 reflected at the interfaces is reduced, and most of the light L generated in the phosphor 3a is incident on the photoelectric transducers 7 directly below the phosphor 3a. Thus, it is possible to enhance sharpness of the radiographic image to be obtained. Since the amount of reflected light L1 and L2 is small, even if the multireflection of the reflected light L1 and L2 is repeated, the influence of the multireflection becomes very small. Thus, the amount of light lost from the light L generated in the phosphor 3a before reaching the photoelectric transducers 7 is significantly small.

The advantages of the optical compensation layer 23 described above can be achieved by preferably disposing the optical compensation layer 23 in contact with at least the surface of the smoothing layer 21 and the substantially conical walls Pa1 in the columnar crystal tip Pa regions of the phosphor 3a, as illustrated in FIGS. 8 and 10. That is, the optical compensation layer 23 is preferably disposed in contact (i.e., close contact) with the walls Pa1 and the smoothing layer 21 such that air (or a low vacuum) is not trapped therebetween.

The optical compensation layer 23 is transparent such that the light generated in the phosphor 3a in the scintillator 3 in response to irradiated radiation reaches the photoelectric transducers 7 through the optical compensation layer 23 and the smoothing layer 21. The optical compensation layer 23 preferably has a high light transmittance of 90% or higher.

In this embodiment, a coating layer 25 is actually disposed between the optical compensation layer 23 and the columnar crystal tips Pa of the phosphor 3a in the scintillator 3, as will be described below (see FIGS. 13 and 14). Thus, the refractive index $n_{23}$ of the optical compensation layer 23 will be described below in association with the refractive index $n_{25}$ of the coating layer 25.

In this embodiment, the photoelectric transducers 7 and other component are disposed on the device substrate 4 (see FIG. 6), and a reflective layer (not shown) is disposed on the scintillator substrate 34 to prevent leakage of the light generated in the scintillator 3 to the radiation incident surface R (see FIGS. 1 and 2 and the top side in FIG. 6).

Thus, if the optical compensation layer 23, for example, is composed of a light-curable resin, including an ultraviolet-curable resin which cures by irradiation of light such as ultraviolet rays, the photoelectric transducers 7 and the reflective layer prevents the light, such as ultraviolet rays, from reaching the resin. Consequently, it is difficult to form the optical compensation layer 23 by resin curing.

Accordingly, the optical compensation layer 23 according to this embodiment is preferably composed of a heat-curable resin which cures by applying heat. An epoxy, acrylic, silicone, or urethane heat-curable resin is preferably selected as the heat-curable resin on the basis of high transparency, ease of handling, and glass transition temperature, which will be described below.

Alternatively, a sheet of hot-melt resin may be selected that adheres to organic and inorganic materials in a heated and melted state, does not adhere in a solid state at ambient temperature, and does not contain any solvent. It is preferred that the hot-melt resin be primarily composed of a polyolefin, polyester, or polyamide resin. In particular, the hot-melt resin may contain a base material composed of a polyolefin resin, which has high moisture-proof properties and high light transmittance. Since the hot-melt resin is provided as a sheet, the optical compensation layer has a relatively constant thickness. Thus, uniform image quality can be achieved.

If the optical compensation layer 23 is composed of such a heat-curable resin or hot-melt resin, the glass-transition temperature of the phosphor binding resin should be higher than or equal to the process temperature of the optical compensation layer 23 (the curing temperature of the heat-curable resin or the melting temperature of the hot-melt resin) to achieve uniform image quality. The degradation of the phosphor binding resin can be prevented by satisfying such relationships.

This holds for a resin layer composed of an adhesive. The procedure of the formation of the optical compensation layer 23 by curing the heat-curable resin will be described in association with the production of the radiation detecting panel SP.

[Formation of Coating Layer on Phosphor]

Figure 11:
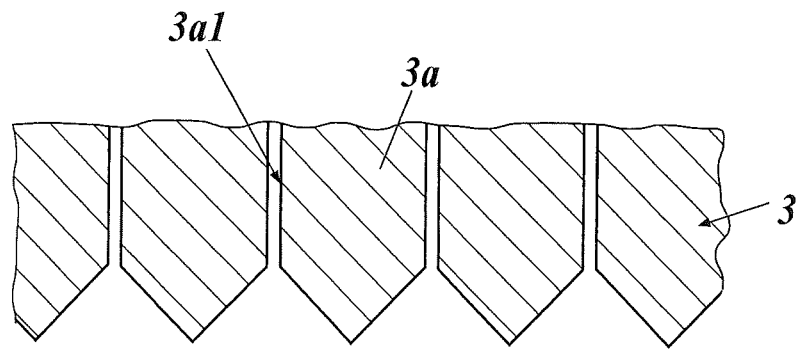
FIG. 11 illustrates gaps between columnar crystals of a phosphor in a scintillator.

The columnar crystals of the phosphor 3a in the scintillator 3 illustrated in FIGS. 5 to 9 are in contact with their adjoining columnar crystals. Actually, however, the columnar crystals of the phosphor 3a in the scintillator 3 are disposed with gaps between their adjoining columnar crystals, as illustrated in FIG. 11.

The relatively large difference between the refractive index $n_{3a}$ of the phosphor 3a and the refractive index of the air or low vacuum between the phosphor 3a causes the light generated in the columnar crystals of the phosphor 3a to be reflected at the sidewalls 3a1 of the columnar crystals, preventing the light from leaking outside the columnar crystals. Thus, a large amount of the light is incident on the photoelectric transducers 7 (not shown in FIG. 11) directly below the position from which the generated light is emitted.

Figure 12:
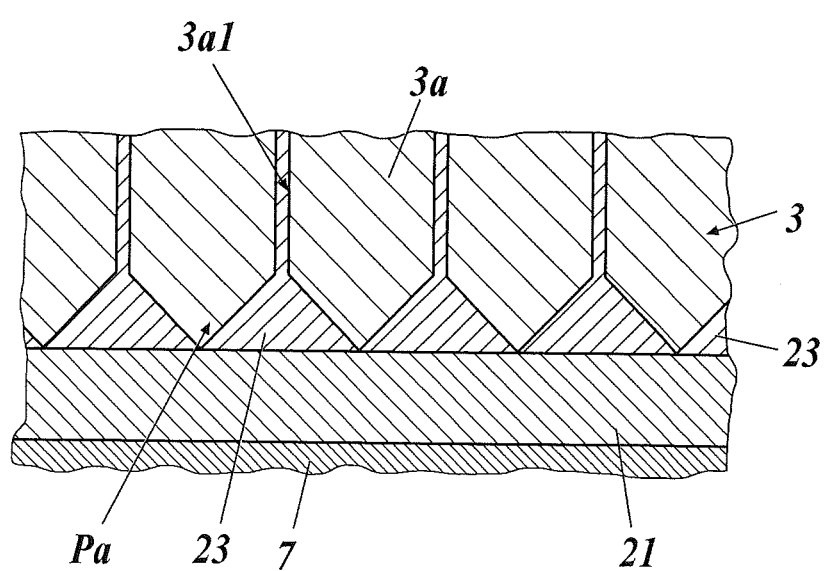
FIG. 12 illustrates a resin composing an optical compensation layer intruding into the gaps between columnar crystals of a phosphor in a scintillator by capillary action.

In a configuration where a resin is applied over the smoothing layer 21 on the device substrate 4 to form the optical compensation layer 23, and the scintillator 3 is positioned such that the columnar crystal tips Pa of the phosphor 3a in the scintillator 3 point toward the smoothing layer 21, as described above, the resin may intrude into the gaps between the columnar crystals by capillary action, as illustrated in FIG. 12.

The optical compensation layer 23 formed by curing the resin in this state decreases the proportion of the light reflected at the interface, as described above. This decreases the proportion of the light reflected at the sidewalls 3a1 of the columnar crystals, causing the light to easily leak from the columnar crystals.

When light leaks out from the columnar crystals, the light L generated in the phosphor 3a in the scintillator 3 diffuses in a direction orthogonal (the horizontal direction in FIG. 12) to the longitudinal direction (the vertical direction in FIG. 12) of the columnar crystals. As a result, radiographic images with high sharpness cannot be obtained.

Figure 13:
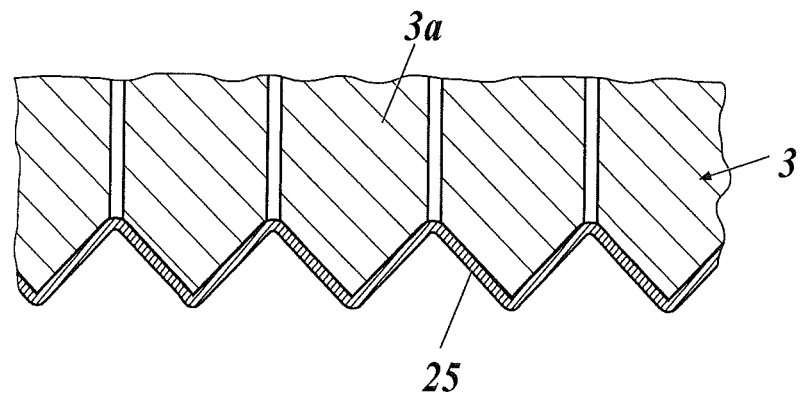
FIG. 13 illustrates a coating layer covering a columnar crystal tip region of a phosphor of a scintillator.

Thus, it is preferred to apply, for example, a thin coating layer 25 over the columnar crystal tip Pa regions of the phosphor 3a in the scintillator 3, as illustrated in FIG. 13. It is preferable to position the scintillator 3 such that the columnar crystal tips Pa of the phosphor 3a in the scintillator 3 point toward the smoothing layer 21 with the coating layer 25 applied, as illustrated in FIG. 14.

Figure 14:
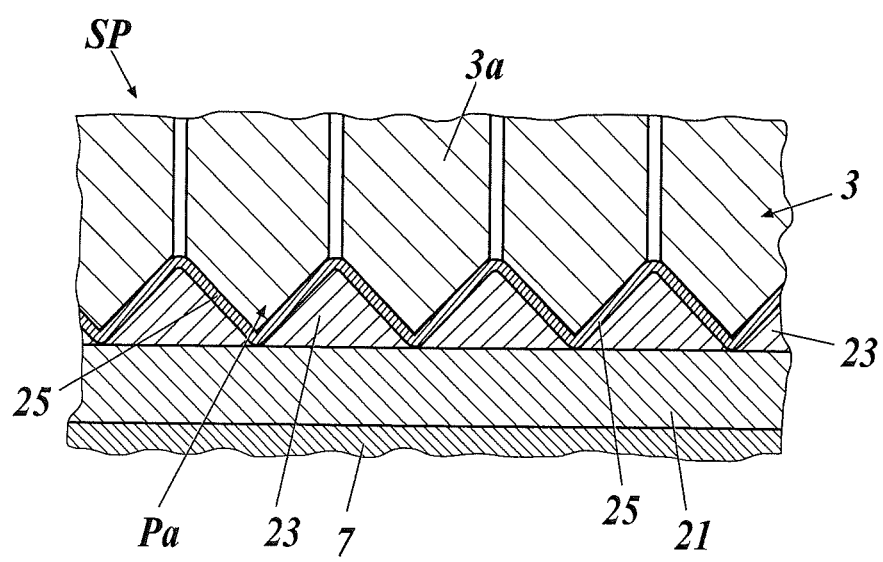
FIG. 14 illustrates a resin prevented by a coating layer from intruding into the gaps between columnar crystals of a phosphor in a scintillator by capillary action.

The coating layer 25 prevents the resin applied to form the optical compensation layer 23 from intruding into the gaps between the columnar crystals of the phosphor 3a by capillary action, as illustrated in FIG. 14. Thus, it is possible to prevent the light generated in the columnar crystals of the phosphor 3a from leaking out from the columnar crystals and to prevent diffusion of the light along the surface. Consequently, radiographic images with high sharpness can be acquired.

In a case of the coating layer 25 applied to the columnar crystal tip Pa regions of the phosphor 3a in the scintillator 3, the refractive index $n_{25}$ of the coating layer 25 is preferably greater than or equal to smaller one of the refractive index $n_{6a}$ of the columnar crystals of the phosphor 3a and the refractive index $n_{23}$ of the optical compensation layer 23, and is preferably smaller than or equal to greater one.

Such a configuration decreases the difference between the refractive indices of the columnar crystals of the phosphor 3a and the coating layer 25 and the difference between refractive indices of the coating layer 25 and the optical compensation layer 23 and decrease the proportion of the light L generated in the phosphor 3a to be reflected at the interface of the columnar crystals of the phosphor 3a and the coating layer 25 or the interface of the coating layer 25 and the optical compensation layer 23.

Thus, similar to the case described above, the incidence of the light L, which is generated in the phosphor 3a in the scintillator 3, on the photoelectric transducers 7 directly below the phosphor 3a can be increased, and radiographic images with high sharpness can be acquired. A large proportion of the light L generated in the phosphor 3a in the scintillator 3 is not multireflected and reaches the photoelectric transducers 7 through the shortest path. Thus, the light can reach the photoelectric transducers 7 with almost no loss in the intensity, and the sensitivity of the image acquisition can be increased.

It is preferred that the coating layer 25 be composed of poly-para-xylene. The refractive index of poly-para-xylene is approximately 1.6. Thus, if the columnar crystals of the phosphor 3a in the scintillator 3 are composed of CsI:Tl (the refractive index $n_{6a}$ is approximately 1.8), and the optical compensation layer 23, for example, is composed of an acrylic resin (the refractive index $n_{21}$ is approximately 1.5), the conditions concerning the refractive index $n_{25}$ of the coating layer 25 are satisfied.

The coating layer 25 composed of poly-para-xylene can be deposited with significantly high efficiency. Thus, the coating layer 25 can be readily deposited over the columnar crystal tip regions of the phosphor 3a in the scintillator 3.

[Method of Producing Radiation Detecting Panel and Radiographic Detector]

The method of producing the radiation detecting panel SP and the radiographic detector 1 will now be described. The radiation detecting panel SP, for example, is produced in accordance with the flowchart in FIG. 15.

The method of producing the radiation detecting panel SP according to this embodiment includes a step of performing atmospheric-pressure plasma treatment (Step S1) on the surfaces of the smoothing layer 21 and coating layer 25 (i.e., the surfaces in contact with the optical compensation layer 23) under atmospheric pressure to prevent the optical compensation layer 23 as the resin layer from separating from the smoothing layer 21 disposed over the device substrate 4 and the coating layer 25 disposed over the columnar crystal tips Pa of the phosphor 3a in the scintillator 3.

The atmospheric-pressure plasma treatment may be performed on either the surface of the smoothing layer 21 or the surface of the coating layer 25. Whether the treatment is to be performed on one or both of the surfaces is determined on the basis of the separation tendency of the optical compensation layer 23 as the resin layer from the surfaces.

A typical atmospheric-pressure plasma treatment may be performed as the atmospheric-pressure plasma treatment of the present embodiment. The intensity of the treatment will be described below in association with the delamination strength of the resin layer (i.e., the optical compensation layer 23 in this embodiment).

The next step in the method of producing the radiation detecting panel SP (Step S2) involves the formation of the optical compensation layer 23 by applying a transparent heat-curable resin on the smoothing layer 21, which is disposed over the two-dimensional array of photoelectric transducers 7 disposed on the upper surface 4a of the device substrate 4.

Alternative to the application of the resin on the smoothing layer 21 of the device substrate 4, a transparent heat-curable resin may be applied to the coating layer 25 disposed over the columnar crystal tip Pa regions of the phosphor 3a in the scintillator 3 on the scintillator substrate 34, as described above (see FIGS. 13 and 14).

The step of disposing the scintillator substrate 34 over the device substrate 4 and disposing the scintillator 3 over the photoelectric transducers 7 (Step S3) is carried out with the columnar crystal tips Pa of the phosphor 3a in the scintillator 3 pointing toward the photoelectric transducers 7 on the device substrate 4.

The columnar crystal tips Pa of the phosphor 3a in the scintillator 3 and the coating layer 25 are inserted into a soft resin, causing the resin which is to be the optical compensation layer 23 to fill the space between the smoothing layer 21 and the columnar crystal tip Pa regions of the phosphor 3a in the scintillator 3.

In this state, the radiation detecting panel SP is heated to an appropriate temperature to cure the heat-curable resin. In this way, the optical compensation layer 23 is formed between the smoothing layer 21 and the columnar crystal tip Pa regions of the phosphor 3a.

The heat-curable resin may be cured after the step of reduced-pressure bonding (Step S5), which will be described below. In such a case, the heat-curable resin may be temporarily cured to an appropriate state in the step of disposing the scintillator (Step S3).

As illustrated in FIGS. 6 and 7, a step of temporarily bonding the device substrate 4 and the scintillator substrate 34 with the adhesive 22 (Step S4) is carried out on the radiation detecting panel SP by applying the adhesive 22 and the spacers S contained in the adhesive 22 in the surrounding areas of the photoelectric transducers 7 and the scintillator 3 in the gap between the device substrate 4 and the scintillator substrate 34.

It is preferred that the adhesive 22 does not completely surround the photoelectric transducers 7 and the scintillator 3 and at least one opening 24 that connects the inner space C and the outer space be formed in the adhesive 22, as illustrated in FIG. 16, for example.

As described above, the step of reduced-pressure bonding (Step S5) is carried out while the device substrate 4 and the scintillator substrate 34 are bonded together with reduced-pressure in the inner space C defined by the device substrate 4, the scintillator substrate 34, and the adhesive 22. The configuration of a chamber 50 used in the reduced-pressure bonding will be described below. The process of reduced-pressure bonding is described in detail in Japanese Patent Application Laid-Open Publication No. 2010-43887 submitted by the applicant of this specification.

In this case, the adhesive 22 is composed of a light-curable resin that is cured by irradiating light such as ultraviolet rays. An ultraviolet-curable adhesive is used in this embodiment. Alternatively, adhesives that can be cured by light of other wavelengths may be used. A heat-curable resin may also be used as the adhesive 22.

Figure 17:
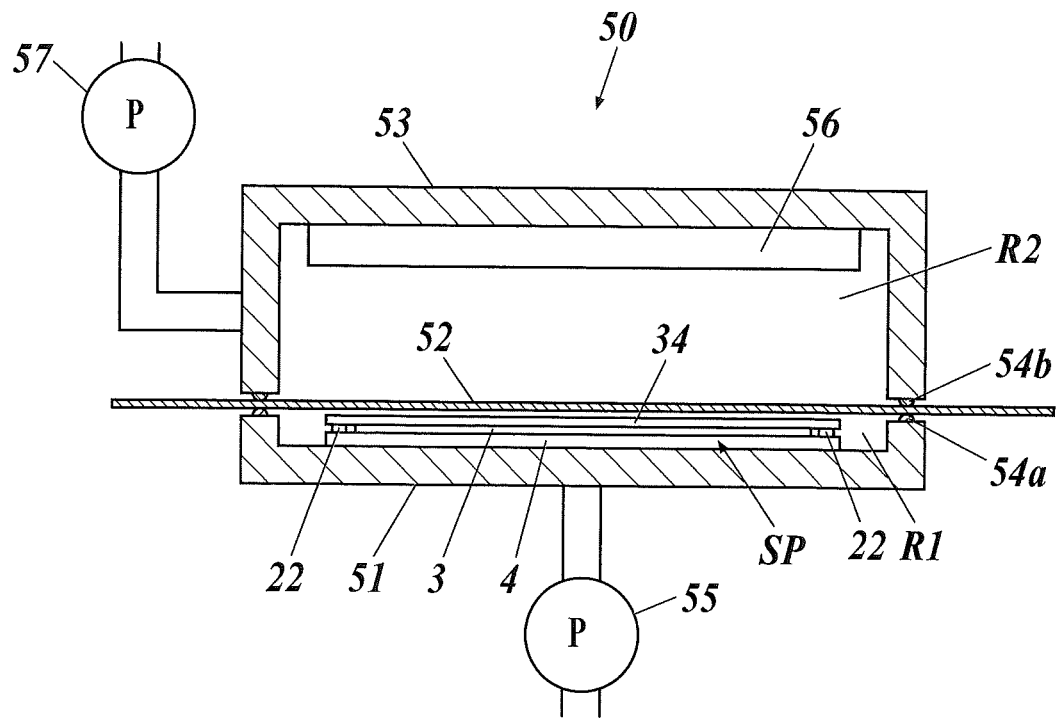
FIG. 17 illustrates an example configuration of a chamber used for producing a radiation detecting panel.

As illustrated in FIG. 17, the chamber 50 includes a platform 51 having a flat bottom surface, a film 52, and a cover 53. Sealing members 54a and 54b in O-ring shapes are disposed on the platform 51 and the cover 53. The chamber 50 is tightly sealed as a result of disposing the cover 53 such that the sealing members 54a and 54b clamp the film 52 from the top and bottom. The film 52 is composed of a stretchable material that transmits ultraviolet rays.

A pressure reducing pump 55 is disposed so as to connect an opening (not shown) in the bottom of the platform 51. An ultraviolet irradiation device 56 is attached to the inside of the cover 53, and a pump 57 is disposed in an opening (not shown) in the cover 53. The pump 57 is not essential, and alternatively, a simple opening may be provided.

In the step of reduced-pressure bonding (Step S5), the device substrate 4 and the scintillator substrate 34 temporarily bonded with the adhesive 22 are disposed on the platform 51 in the chamber 50, the film 52 is disposed over these, and the cover 53 is disposed.

FIG. 17 illustrates a case in which the device substrate 4 is disposed below the scintillator substrate 34. Alternatively, the top and bottom may be reversed. As described above, the humid air in the inner space C causes components in the phosphor 3a in the scintillator 3 to deliquesce and leak out. Thus, at this time, it is preferable to replace the air in the chamber 50 or at least the gap between the film 52 and the platform 51 of the chamber 50 in which the radiation detecting panel SP is disposed (hereinafter, this gap is referred to as "lower space R1", see FIG. 17) with dry air or inert gas.

Then, in the above state, the pressure reducing pump 55 is activated to reduce the pressure in the lower space R1 in the chamber 50 in which the radiation detecting panel SP is disposed. In such a case, the internal pressure in the lower space R1 (i.e., the pressure inside the inner space C of the radiation detecting panel SP), for example, is reduced below atmospheric pressure within the range of 0.2 to 0.5 atmospheric pressure.

In this case, the space above the film 52 inside the chamber 50 (hereinafter, referred to as "upper space R2", see FIG. 17) remains at atmospheric pressure. Alternatively, the pump 57 may be operated to control the pressure in the upper space R2. In such a case, the pressure in the upper space R2 is adjusted to be higher than the pressure in the lower space R1.

Figure 18:
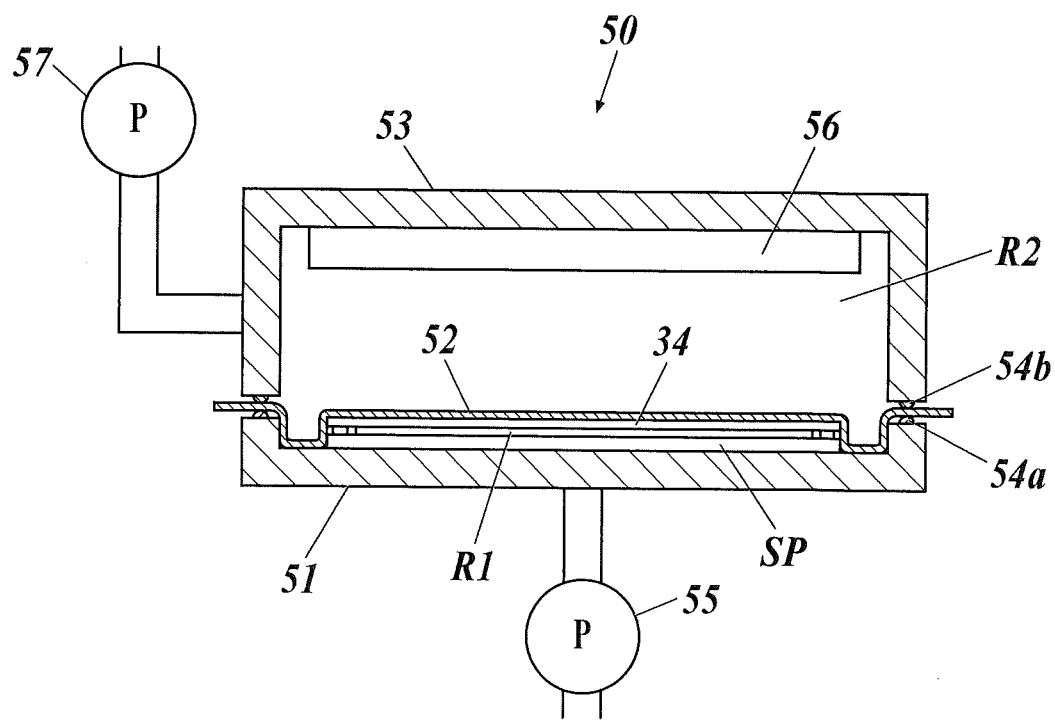
FIG. 18 illustrates a substrate and a support bonded together by reducing the pressure in the space between a chamber base and a film.

As the pressure in the lower space R1 in the chamber 50 decreases, the form of the film 52 changes from that in FIG. 17 to a form adhering to the top of the scintillator substrate 34 of the radiation detecting panel SP, as illustrated in FIG. 18. As a result, the radiation detecting panel SP is urged through the film 52 from above by the pressure in the upper space R2, and the device substrate 4 and the scintillator substrate 34 are bonded together.

The opening 24 in the adhesive 22 formed in the step of temporary bonding (Step S4), as illustrated in FIG. 16, allows gas inside the inner space C in the radiation detecting panel SP to be removed therethrough, causing a reduction in the internal pressure in the inner space C.

Figure 19:
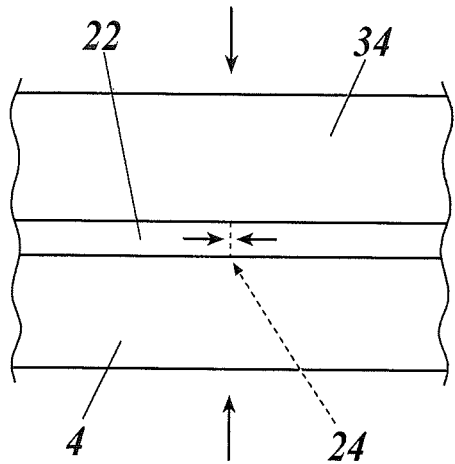
FIG. 19 illustrates an opening sealed by an adhesive extending in the horizontal direction.

The opening 24 formed with an appropriate size in advance is automatically sealed by the adhesive 22 spreading in the horizontal direction when the scintillator substrate 34 and the device substrate 4 move close together due to the pressure from the upper space R2, as illustrated in FIG. 19. If the opening 24 is not automatically sealed, the adhesive 22 or some other sealant may be applied to the opening 24 for sealing.

In this condition (see FIG. 18), the adhesive 22 is cured by irradiation with ultraviolet rays from the ultraviolet irradiation device 56 in the chamber 50, and consequently, the device substrate 4 and the scintillator substrate 34 are bonded together. Since the opening 24 is sealed, the inner space C is sealed with the pressure lower than atmospheric pressure.

To assure curing of the adhesive 22, the radiation detecting panel SP may be heated after irradiation with the ultraviolet rays to bake the adhesive 22.

Figure 20:
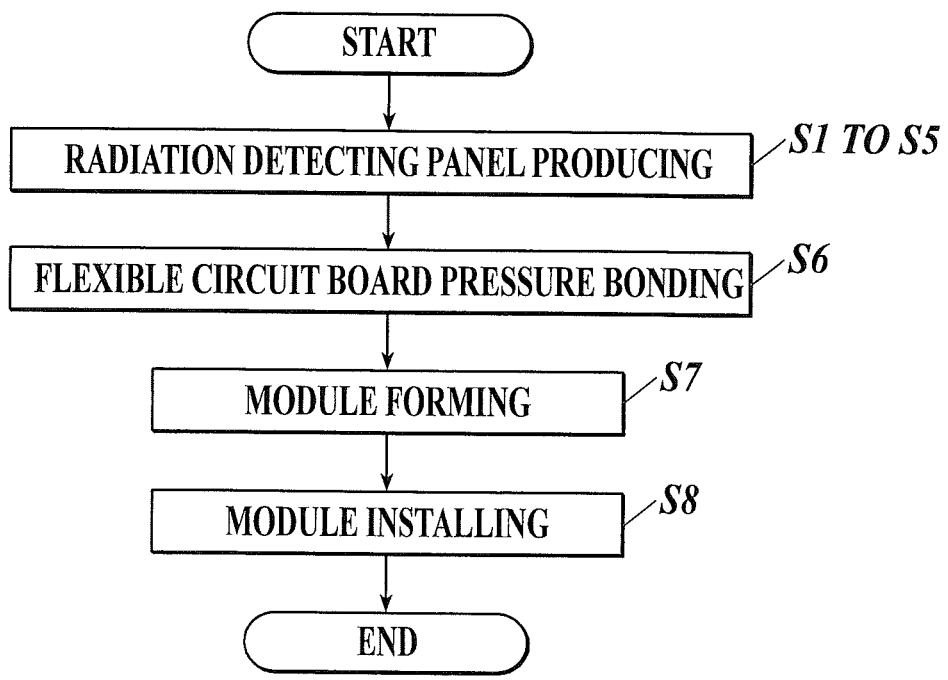
FIG. 20 is a flow chart of a method of producing a radiographic detector.

The radiographic detector 1 is produced, for example, in accordance with the flow chart in FIG. 20 using the radiation detecting panel SP prepared as described above.

That is, a step of pressure-bonding the flexible circuit board 12 (Step S6) is carried out by applying the anisotropic conductive film or paste mentioned above to the I/O terminals 11 (see FIG. 4) of the device substrate 4 of the radiation detecting panel SP, which has been produced in accordance with the method described above (Steps S1 to S5).

After the I/O terminals 11 is pressure-bonded to the flexible circuit board 12, a step of inspecting the conductivity of the I/O terminals 11 and the flexible circuit board 12 is carried out, and then unwanted parts of the device substrate 4 and the scintillator substrate 34 are removed. As illustrated in FIG. 4, the device substrate 4 is bonded to the upper surface of the substrate 31, and the PCB board 33 on which the electronic components 32 are mounted is attached to the bottom surface of the substrate 31.

The flexible circuit board 12 extends to the lower surface 4b of the device substrate 4 and is connected to a terminal on the PCB board 33 at the lower surface 4b side by pressure-bonding (Step S7 in forming a module). Then, inspections are conducted to check the connection via the flexible circuit board 12 among the electronic components 32 on the PCB board 33 and the photoelectric transducers 7 and TFTs 8 on the device substrate 4 and to check the operation of the radiation detecting panel SP.

The radiographic detector 1 is produced by accommodating the radiation detecting panel SP module, which is prepared as described above, in the housing 2 (Step S8 of installing the module), as illustrated in FIG. 2.

[Configuration for Preventing Softening and/or Separation of Resin Layer]

A configuration will now be described that prevents softening and/or separation of the resin layer disposed between the scintillator 3 and the photoelectric transducers 7, smoothing layer 21 in the radiation detecting panel SP according to this embodiment and the radiographic detector 1 including the radiation detecting panel SP.

As described above, a change in the distance between the photoelectric transducers 7 and the scintillator 3 due to the softening of the resin layer such as the optical compensation layer 23 disposed between the scintillator 3 and the photoelectric transducers 7, smoothing layer 21 causes the light generated inside the phosphor 3a of the scintillator 3 to leak out to the photoelectric transducers 7 other than those directly below the phosphor 3a. This may cause a decrease in the sharpness of the resulting radiographic image.

A major factor causing the softening of the resin layer is temperature. The softening of the resin layer may be caused by various types of temperature, such as the temperature of the radiation detecting panel SP, which increases during the operation of the radiographic detector 1, the environmental temperature of the radiographic detector 1 in use, the environmental temperature of the radiation detecting panel SP and the radiographic detector 1 during transportation by ship or other means, and the temperature measured in the production steps described above.

According to a research conducted by the inventors, the highest temperature among the temperatures regarding the radiation detecting panel SP and the various types of ambient temperatures of the radiographic detector 1 was 60° C., which is assumed to be the highest ambient temperature of the radiation detecting panel SP and radiographic detector 1 during transportation by ship.

If the adhesive 22 is to be baked at the final stage of the production process of the radiation detecting panel SP, the radiation detecting panel SP is heated to approximately 60° C.

Thus, the resin layer according to this embodiment is composed of a resin having a glass-transition temperature of 60° C. or higher so that the resin layer such as the optical compensation layer 23 disposed between the scintillator 3 and the photoelectric transducers 7, smoothing layer 21 is not softened even if the radiation detecting panel SP is heated to 60° C., which is the maximum temperature during transportation of the radiation detecting panel SP and the radiographic detector 1 by ship.

Such a configuration prevents the softening of the resin layer such as the optical compensation layer 23 disposed between the scintillator 3 and the photoelectric transducers 7, smoothing layer 21 during normal use of the radiographic detector 1 (during capturing of radiographic images), during transportation of the radiation detecting panel SP and the radiographic detector 1 by ship, and during heating of the radiation detecting panel SP for baking the resin layer in the production process of the radiation detecting panel SP.

The resin layer may have any maximum glass-transition temperature. The higher the glass-transition temperature of the resin layer is, it is possible to more securely prevent the softening of the resin layer at 60° C., which is the maximum temperature attained in the use environment and the transportation environment of the radiographic detector 1.

An excessively high glass-transition temperature of the resin layer may cause damage to the photoelectric transducers 7 and the TFTs 8 by the resin heated to a high temperature during application of a softened high-temperature resin to the smoothing layer 21 of the device substrate 4, for example. Thus, the resin layer is composed of a resin having a glass-transition temperature of 60° C. or higher and a glass-transition temperature within a range of temperature according to common sense so as not to cause damage to the photoelectric transducers 7 and other components.

As described above, the separation of the resin layer from the photoelectric transducers 7, smoothing layer 21 and/or the scintillator 3 decreases the geometric precision of the photoelectric transducers 7 and the scintillator 3. Thus, as described above, the light generated inside the phosphor 3a in the scintillator 3 may leak out to the photoelectric transducers 7 other than those directly below the phosphor 3a. This may result in a decrease in the sharpness of the resulting radiographic image.

If the resin layer is composed of a resin having the glass-transition temperature described above, the resin layer is not softened by increases in the temperature of the radiation detecting panel SP and the temperature of the operational environment of the radiographic detector 1. This configuration can considerably prevent the separation of the resin layer from the photoelectric transducers 7, smoothing layer 21 and the scintillator 3.

The resin layer such as the optical compensation layer 23 according to this embodiment has a delamination strength of 1.5 kg/cm$^2$ or higher in order to prevent the separation of the resin layer from the photoelectric transducers 7, the smoothing layer 21, and/or the scintillator 3 resulting from various physical impacts other than temperature, such as warpage in the radiation detecting panel SP.

According to a research conducted by the inventors, a resin layer having the delamination strength mentioned above does not separate from the photoelectric transducers 7 and the scintillator 3, under a normal operation environment of the radiographic detector 1 in which, for example, a patient's body is placed on the radiation incident surface R of the radiographic detector 1, without any abnormal operation, such as bending the radiographic detector 1 with an abnormal force.

A resin layer having a delamination strength lower than the lower limit of 1.5 kg/cm$^2$ easily separates from the photoelectric transducers 7, smoothing layer 21 and the scintillator 3, and thus, the advantages described above cannot be achieved.

An intense atmospheric-pressure plasma treatment of preparing a resin layer, for example, having a delamination strength of 15 kg/cm$^2$ or higher will cause strengthening of delamination strength of the resin layer. However, the above treatment also causes characteristic changes in the photoelectric transducers 7 and the TFTs 8 on the device substrate 4. As a result, the radiographic detector 1 cannot capture adequate radiographic images in some cases.

For practical use, the resin layer such as the optical compensation layer 23 preferably has a delamination strength within the range of 1.5 to 15 kg/cm$^2$.

[Advantageous Effect]

As described above, in the radiation detecting panel SP according to this embodiment and the radiographic detector 1 including the radiation detecting panel SP, the glass-transition temperature and the delamination strength of the resin layer such as the optical compensation layer 23 disposed between the photoelectric transducers 7 and the scintillator 3 are determined as described above. Thus, the resin layer is prevented from softening due to the temperatures of the operational environment, the transportation environment, and the manufacturing environment of the radiation detecting panel SP and the radiographic detector 1.

In a normal operational environment of the radiographic detector 1, the resin layer such as the optical compensation layer 23 can be prevented from separating from the photoelectric transducers 7, the smoothing layer 21, and/or the scintillator 3 even if a bending force is applied to the radiographic detector 1 and/or the radiation detecting panel SP.

This can prevent a change in the distance between the photoelectric transducers 7 and the scintillator 3 due to the softening of the resin layer and a decrease in the geometric precision of the photoelectric transducers 7 and the scintillator 3 due to the separation of the resin layer from the photoelectric transducers 7, the smoothing layer 21, and/or the scintillator 3. Thus, the light generated in the phosphor 3a of the scintillator 3 enters the photoelectric transducers 7 directly below the position from which the generated light is emitted without leakage.

The radiation detecting panel SP according to this embodiment and the radiographic detector 1 including the radiation detecting panel SP can prevent decrease in the sharpness of the radiographic images. Therefore, it is possible to capture stable high-quality radiographic images without a decrease in the sharpness of the resulting radiographic images.

According to a research conducted by the inventors for the acquisition of radiographic images with satisfactory sharpness, it is preferred that the distance be 50μ or less between the photoelectric transducers 7 and the scintillator 3 across the resin layer and the coating layer 25 of the radiation detecting panel SP, i.e., the distance between the surface of the photoelectric transducers 7 closer to the scintillator 3 and the part of the scintillator 3 closest to the photoelectric transducers 7 (which is the columnar crystal tip Pa regions of the phosphor 3a in the scintillator 3 in this embodiment (see FIG. 14)).

Similar to the optical compensation layer 23 as the resin layer according to this embodiment, when the adhesive layer 106 is disposed between the scintillator 104 and the photoelectric transducers 102, smoothing layer 105, as illustrated in FIGS. 23 and 24, the adhesive layer 106 as the resin layer may include structures such as spacers S, in such a manner similar to the adhesive 22 according to this embodiment (see FIG. 7).

If the length of the structures is larger than or equal to the wavelength of the light irradiated on the photoelectric transducers 7 and 102 from the scintillators 3 and 104, the light diffused by the structures cause a decrease in the sharpness of the radiographic images and a decrease in the amount of light incident on the photoelectric transducers 7 and 102 directly below the small structures.

Thus, it is preferred that the adhesive layer 106 and the optical compensation layer 23, which are composed of resin layers, do not include a structure such as a spacer S, or at least do not include a structure having a length that is larger than or equal to the wavelength of the light irradiated on the photoelectric transducers 7 and 102 from the scintillators 3 and 104.

The warpage of the radiation detecting panel SP may be caused by an external force applied to the radiographic detector 1 and the radiation detecting panel SP, as described above, and also by stress generated inside the radiation detecting panel SP.

Specifically, as described in this embodiment, the resin layer as the optical compensation layer 23 is disposed over the upper surface of the photoelectric transducers 7 or the smoothing layer 21 on the upper surface 4a of the device substrate 4 by applying a heated soft resin to the smoothing layer 21 during production. In this embodiment, the resin layer is composed of a heat-curable resin. Thus, the resin layer such as the optical compensation layer 23 is formed by disposing the scintillator 3 on the resin applied to the smoothing layer 21 and heating and curing the heat-curable resin before or after performing the reduced-pressure bonding as described above.

Figure 21:
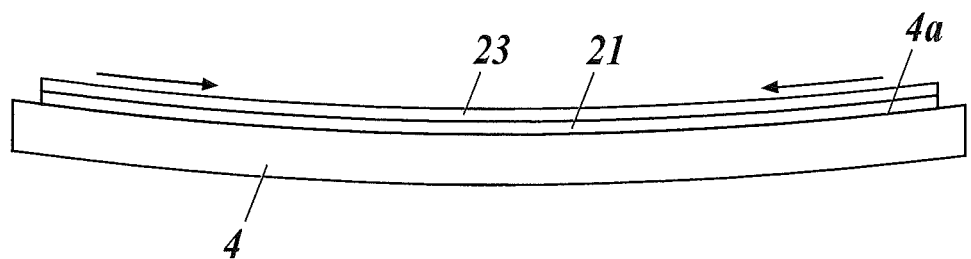
FIG. 21 illustrates warpage in a device substrate caused by the upper surface of the device substrate being pulled by a contracting resin layer.

As the resin layer cured at a high temperature cools, the resin layer may contract. If the resin layer contracts, the upper surface 4a of the device substrate 4 is pulled in the horizontal direction in the drawing by the contracting resin layer (for example, the optical compensation layer 23), as illustrated in FIG. 21. Thus, the device substrate 4 may bend upward at the edges toward the resin layer (toward the optical compensation layer 23, for example). The scintillator 3 and the scintillator substrate 34 are not shown in FIG. 21 and FIG. 22, which will be described below.

In this embodiment, the support 3b is bonded to the lower surface 34a of the scintillator substrate 34 to attach the scintillator 3 on the lower surface 34a, as illustrated in FIG. 5.

Although not shown in the drawing, use of a resin having a large expansion/contraction rate as an adhesive to bond the support 3b to the lower surface 34a of the scintillator substrate 34 and the resin layer disposed between the support 3b and the lower surface 34a for various purposes may cause warpage similar to that described above.

Although not illustrated, such a resin or resin layer may contract as its temperature decreases from a high temperature state. If the resin or resin layer contracts, the lower surface 34a of the scintillator substrate 34 is pulled in the extension direction of the resin or resin layer (the horizontal direction in FIG. 5). Thus, the scintillator substrate 34 may bend as its edges are pushed downward.

According to a research conducted by the inventors, even if warpage occurs in the device substrate 4 and/or the scintillator substrate 34 due to contraction of the resin, the separation of the resin layer can be prevented by establishing a delamination strength within the range of 1.5 to 15 kg/cm² for the resin layer such as the optical compensation layer 23.

The configuration described below can prevent warpage in the device substrate 4 and the scintillator substrate 34 even if contraction of the resin occurs due to a decrease in temperature.

Figure 22:
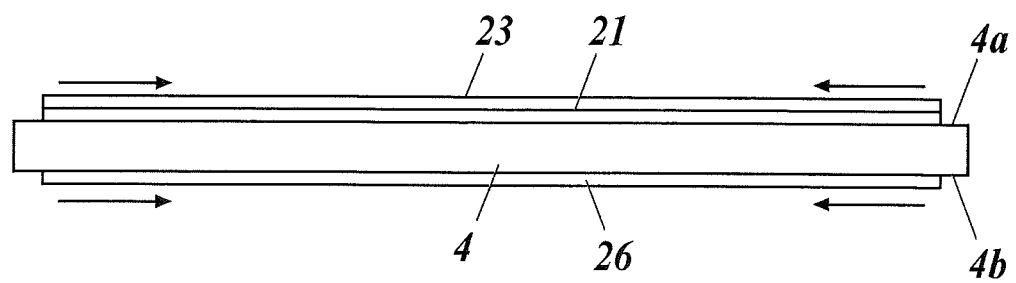
FIG. 22 illustrates the prevention of the warpage in a device substrate by applying a resin or resin sheet on a surface of the device substrate opposite from a resin layer.

That is, as illustrated in FIG. 22, for example, the photoelectric transducers 7 are arranged in a two-dimensional matrix (which is not shown in FIG. 22), and a resin 26 or resin sheet 26 is applied to the lower surface 4b, which is the surface opposite from the upper surface 4a of the device substrate 4 on which the smoothing layer 21 is disposed. The resin 26 or resin sheet 26 may be composed of the same resin used to form the resin layer such as the optical compensation layer 23 (hereinafter, referred to as "resin layer 23").

In such a configuration, the resin layer 23 softened by heat is applied to the upper surface 4a of the device substrate 4, cured by heat as described above, and then contracts due to a decrease in temperature from a high temperature. Following this, the resin 26 or resin sheet 26 applied to the lower surface 4b of the device substrate 4 contracts due to a decrease in temperature from a high temperature.

As a result, the resin 26 or resin sheet 26 pulls the lower surface 4b of the device substrate 4 against the force of the resin layer 23 pulling the upper surface 4a of the device substrate 4. Thus, the device substrate 4 is prevented from bending upward toward the resin layer 23 or the upper surface 4a or bending toward the resin 26, the resin sheet 26, or the lower surface 4b.

If warpage of the scintillator substrate 34, which is not illustrated, occurs as described above, a resin or resin sheet may be applied to the surface opposite from the lower surface 34a (see FIG. 5) of the scintillator substrate 34 on which the scintillator 3 is disposed (i.e., the upper surface of the scintillator substrate 34 illustrated in FIG. 6, for example), in such a manner similar to that of the device substrate 4.

Similar to the device substrate 4 described above, this configuration prevents the scintillator substrate 34 from bending upward or downward by cancelling out the contraction of the resin on the lower surface of the scintillator substrate 34 with the contraction of the resin or resin sheet on the upper surface.

The prevention described above of warpage in the device substrate 4 and the scintillator substrate 34 can prevent the separation of the resin layer such as the optical compensation layer 23 disposed between the scintillator 3 and the photoelectric transducers 7, smoothing layer 21. Thus, the sharpness of the resulting radiographic images can be maintained.

According to a research conducted by the inventors, a large load applied to the radiation detecting panel SP and the photoelectric transducers 7 due to the deformation of the housing 2 caused by a patient's body placed on the radiation incident surface R of the radiographic detector 1 (see FIGS. 1 and 2) results in the formation of images of non-existent subjects in the photoelectric transducers 7 receiving the load and the surrounding areas and/or uneven density in the radiographic images.

The radiation detecting panel SP and the radiographic detector 1 preferably have a configuration that reduces the load applied to the photoelectric transducers 7 when a load is applied to the radiation detecting panel SP as a result of the deformation of the housing 2 of the radiographic detector 1. To achieve this, the resin layer (the optical compensation layer 23 in this embodiment) disposed between the scintillator 3 and the photoelectric transducers 7, smoothing layer 21 can be composed of a resin softer than that of the scintillator 3 and the smoothing layer 21.

That is, the resin layer (the optical compensation layer 23 in this embodiment) disposed between the scintillator 3 and the photoelectric transducers 7, smoothing layer 21 is preferably composed of a transparent resin having a hardness lower than the lowest hardness among the photoelectric transducers 7, the smoothing layer 21, and the scintillator 3.

Specifically in this embodiment, the acrylic resin constituting the smoothing layer 21 has an HRM (on a Rockwell hardness scale) of approximately 100, which is lowest among the photoelectric transducers 7, the columnar crystals of the phosphor 3*a* in the scintillator 3, and the acrylic resin constituting the smoothing layer 21. Thus, the HRM of the resin layer is preferably 100 or smaller and more preferably 50 or smaller.

For example, the HRM of polyethylene terephthalate (PET) is known to be in the range of approximately 45 to 95. Thus, a resin layer composed of PET will have an HRM within the range defined above.

A resin layer composed of a soft resin absorbs the load applied to the radiation detecting panel SP by the deformation of the housing 2 of the radiographic detector 1, decreasing the load applied to the photoelectric transducers 7. This can prevent the formation of images of non-existent subjects in the photoelectric transducers 7 receiving the load and the surrounding areas and/or uneven density in the radiographic images.

The present invention is not limited to the above embodiments, and can be suitably modified without leaving the scope of the present invention.

The present application is based on Japanese Patent Application No. 2012-155250 filed on Jul. 11, 2012 and Japanese Patent Application No. 2013-005046 filed on Jan. 16, 2013 to the Japanese Patent Office, which shall be a basis for correcting mistranslations.

What is claimed is:

1. A radiation detecting panel comprising:
   a device substrate including a two-dimensional array of photoelectric transducers on a first surface of the device substrate; and
   a scintillator substrate including a scintillator on a first surface of the scintillator substrate, the scintillator converting radiation to light and irradiating the light onto the photoelectric transducers,
   wherein
   the device substrate and the scintillator substrate are bonded together such that the photoelectric transducers face the scintillator, and
   a resin layer disposed between the photoelectric transducers and the scintillator has a glass-transition temperature of 60° C. or higher.

2. The radiation detecting panel of claim 1, wherein the resin layer has a delamination strength of 1.5 kg/cm$^2$ or more.

3. The radiation detecting panel of claim 1, wherein a resin or resin sheet is applied to a second surface of the device substrate, the second surface being opposite from the first surface of the device substrate including the two-dimensional array of photoelectric transducers, and/or a second surface of the scintillator substrate, the second surface being opposite from the first surface of the scintillator substrate including the scintillator.

4. The radiation detecting panel of claim 1, further comprising:
   a smoothing layer disposed over the photoelectric transducers on a side close to the scintillator,
   wherein the resin layer is disposed between the smoothing layer and the scintillator.

5. The radiation detecting panel of claim 1, wherein
   the scintillator comprises a columnar crystal of phosphor, and
   the device substrate and the scintillator substrate are bonded together such that a tip of the columnar crystal of the phosphor in the scintillator faces the photoelectric transducers.

6. The radiation detecting panel of claim 5, further comprising:
   a smoothing layer disposed over the photoelectric transducers on a side close to the scintillator; and
   a coating layer covering a tip region of the columnar crystal of the phosphor in the scintillator,
   wherein
   the resin layer is disposed between the smoothing layer and the coating layer, and
   the resin layer constitutes an optical compensation layer having a refractive index that is larger than or equal to smaller one of the refractive index of the smoothing layer and the refractive index of the coating layer and is smaller than or equal to larger one of the refractive index of the smoothing layer and the refractive index of the coating layer.

7. The radiation detecting panel of claim 6, wherein the coating layer comprises poly-para-xylene.

8. The radiation detecting panel of claim 1, wherein the resin layer does not include a structure having a length larger than or equal to a wavelength of light irradiated from the scintillator onto the photoelectric transducers.

9. The radiation detecting panel of claim 1, wherein the resin layer comprises an epoxy, acrylic, silicone, or urethane heat-curable transparent resin.

10. The radiation detecting panel of claim 1, wherein the resin layer comprises a transparent resin having a hardness lower than lower one of hardness of the photoelectric transducers and hardness of the scintillator.

11. The radiation detecting panel of claim 1, wherein a distance between surfaces of the photoelectric transducers closer to the scintillator and a section of the scintillator closest to the photoelectric transducers is 50 μm or less.

12. The radiation detecting panel of claim 1, wherein
   the device substrate and the scintillator substrate are bonded together by an adhesive disposed in a gap between the device substrate and the scintillator substrate and in a portion around the photoelectric transducers and the scintillator, and
   the pressure in an internal space defined from outside by the device substrate, the scintillator substrate, and the adhesive is reduced to be lower than atmospheric pressure.

13. The radiation detecting panel of claim 1, wherein
the scintillator comprises a phosphor layer provided by applying phosphor paste including phosphor particles and a phosphor binding resin on the first surface of the scintillator substrate, and
the phosphor binding resin has a glass-transition temperature of 60° C. or higher.

14. The radiation detecting panel of claim 13, wherein the glass-transition temperature of the phosphor binding resin is higher than or equal to a process temperature of the resin layer disposed between the photoelectric transducers and the scintillator.

15. A radiographic detector comprising:
a radiation detecting panel of claim 1.

* * * * *